United States Patent
Rönkkä et al.

(10) Patent No.: US 7,062,766 B2
(45) Date of Patent: *Jun. 13, 2006

(54) EMBEDDED SYSTEM WITH INTERRUPT HANDLER FOR MULTIPLE OPERATING SYSTEMS

(75) Inventors: Risto Rönkkä, Tampere (FI); Vesa Saarinen, Tampere (FI); Janne Kantola, Tampere (FI); Jyrki Leskelä, Oulu (FI); Kim Lempinen, Oulu (FI); Anu Purhonen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/625,099

(22) Filed: Jul. 22, 2003

(65) Prior Publication Data

US 2004/0088710 A1   May 6, 2004

Related U.S. Application Data

(63) Continuation of application No. 09/234,433, filed on Jan. 20, 1999, now Pat. No. 6,631,394.

(30) Foreign Application Priority Data

Jan. 21, 1998   (FI) ..................... 980135

(51) Int. Cl.
*G06F 9/46* (2006.01)

(52) U.S. Cl. ..................... 718/100; 710/260

(58) Field of Classification Search ........... 718/100, 718/102–104, 107–108; 710/260–269
See application file for complete search history.

(56) References Cited

U.S. PATENT DOCUMENTS

| 4,993,017 A | 2/1991 | Bachinger et al. ......... 370/58.2 |
| 5,263,178 A | 11/1993 | Liukkonen ................... 455/76 |
| 5,278,973 A | 1/1994 | O'Brien et al. ............. 395/500 |

(Continued)

FOREIGN PATENT DOCUMENTS

EP   0 326 135 A1   3/1990

(Continued)

OTHER PUBLICATIONS

"Dual System Operation" IBM Technical Disclosure Bulletin, vol. 12, No. 11, Apr. 1970, pp. 1899-1900.

(Continued)

*Primary Examiner*—William Thomson
*Assistant Examiner*—George L. Opie

(57) ABSTRACT

A communication device includes one processor to run at least two operating systems simultaneously. The at least two operating systems include a first operating system for mobile station functions having a first group of threads, the mobile station functions including operations for communicating with another device, and a second operating system for data processing functions having a second group of threads, the data processing functions including operations for processing data internally in the communication device, where the operating systems communicate with each other. The communication device further includes at least one user interface, provides for generating an interrupt, provides for selecting a thread to execute as a result of the interrupt including a common interrupt handler for the at least two operating systems, and provides for transmitting interrupt data to the operating system from which the thread was selected, including the thread to execute.

17 Claims, 14 Drawing Sheets

U.S. PATENT DOCUMENTS

| | | | |
|---|---|---|---|
| 5,301,277 A | 4/1994 | Kanai | 395/275 |
| 5,353,328 A | 10/1994 | Jokimies | 379/58 |
| 5,392,282 A | 2/1995 | Kiema | 370/77 |
| 5,414,848 A | 5/1995 | Sandage et al. | 395/650 |
| 5,490,235 A | 2/1996 | Von Holten et al. | 395/2.79 |
| 5,490,275 A | 2/1996 | Sandvos et al. | 395/700 |
| 5,515,538 A | 5/1996 | Kleiman | 395/733 |
| 5,615,384 A | 3/1997 | Allard et al. | 395/800 |
| 5,657,371 A | 8/1997 | Suomi et al. | 455/418 |
| 5,694,606 A | 12/1997 | Pletcher et al. | 395/734 |
| 5,802,351 A | 9/1998 | Frampton | 395/500 |
| 5,809,115 A | 9/1998 | Inkinen | 379/93.05 |
| 5,974,439 A | 10/1999 | Bollella | 709/104 |
| 6,125,411 A | 9/2000 | Sato | 710/38 |
| 6,260,075 B1 | 7/2001 | Cabrero et al. | 709/310 |

FOREIGN PATENT DOCUMENTS

| | | |
|---|---|---|
| EP | 0 360 135 B1 | 3/1993 |
| JP | 50-108380 | 4/2003 |

OTHER PUBLICATIONS

Japanese Office Action mailed Jul. 26, 2005.
Korean Office Action 10-2000-7007898.
Korean Patent Laid-Open Gazette No. 1998-79486 (published on Nov. 25, 1998).

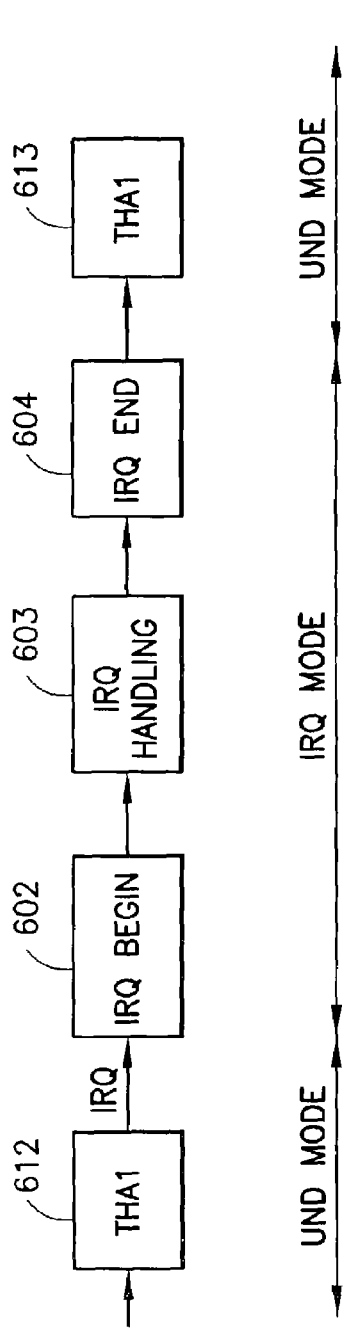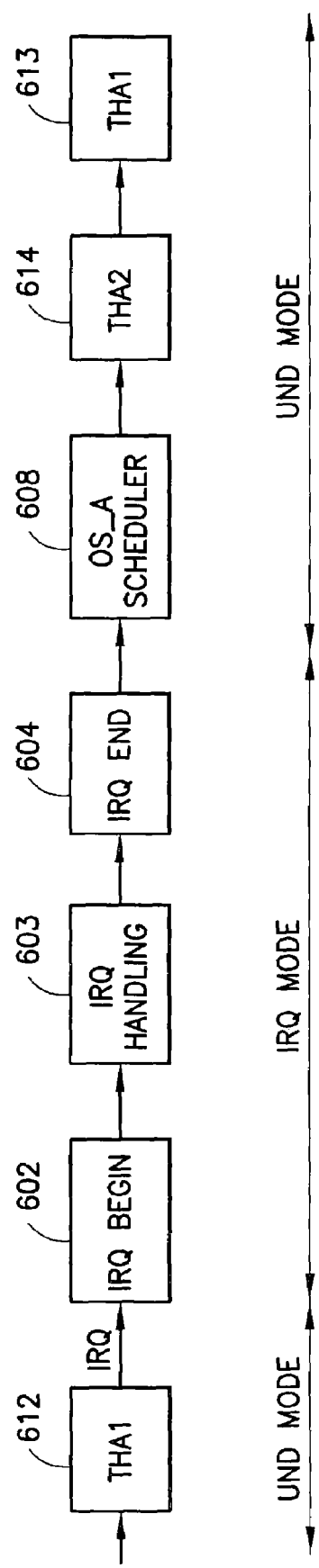
FIG.6g
FIG.6h

EMBEDDED SYSTEM WITH INTERRUPT HANDLER FOR MULTIPLE OPERATING SYSTEMS

CROSS-REFERENCE TO RELATED APPLICATIONS

This application is a continuation of and claims priority from U.S. patent application No. 09/234,433, filed Jan. 20, 1999, issued as U.S. Pat. No. 6,631,394.

FIELD OF THE INVENTION

The present invention relates to a communication device comprising at least one processor to run at least two operating systems, wherein the at least two operating systems include a first operating system comprising a first group of threads, and a second operating system comprising a second group of threads.

BACKGROUND OF THE INVENTION

In electronics industry, numerous devices have been designed having a some sort of microprocessor or a corresponding processor as the basic functional component. This processor can be positioned e.g. in connection with a microcontroller, wherein it has some peripherals positioned in the same microchip. These devices are also called an embedded system, examples of these being mobile stations, such as cellular network mobile stations CMT (Cellular Mobile Telephone), PC (Personal Computer), PDA (Personal Digital Assistant) etc. To control the operation of such a device, often a device specific operating system has been designed, having the basic task of attending to the timings of the system, control of resources, processing and transmitting of messages between different program blocks. Typically, these kind of operating systems are so-called real time operating systems (RTOS). A typical feature for such a real time operating system is e.g. the fact that it can be used for predicting a response time for external interrupt, such as pressing of keys or timing, minimized use of memory resources and, additionally, real time operating systems are very efficient for controlling tasks. Further, in real time operating systems, often properties for controlling capacity have been designed, e.g. in portable devices for extending operation time of batteries. The size of such real time operating systems is usually between 10 and 100 kB of program code and information memory (RAM, Random Access Memory).

Non-real-time operating systems differ from real time operating systems e.g. in the fact that the response times for running different operations are longer than in real time operating systems and, on the other hand, the response times can neither be predicted in non-real time operating systems. In multitasking non-real-time operating systems each executing process retards the running of other processes of the same or lower priority level, wherein also response times can lengthen. Further, the non-real time operating system has no response times determined in the kernel of the operating system, which makes the predictability of the execution speed of such operating system difficult.

Mobile stations have a limited capacity of memory and other system resources. Further, in mobile stations there exists often no system support for peripherals, such as writeable mass memory (Hard Disk) or memory cards, such as FLASH memories. In mobile stations, there is usually no possibility arranged for loading programs to the system in a dynamic manner, i.e., the software of the mobile station is loaded in the manufacturing phase to the mobile station, or in some cases the program can be updated e.g. in connection with maintenance. In addition, many mobile stations comprise no memory management unit (MMU), because mobile station software are typically manufactured and tested by mobile station manufacturers. Due to these grounds, device-specific real-time operating systems also comprise no support for the above-mentioned properties.

Companies manufacturing personal computers and personal digital assistants have developed operating systems having support for the above-mentioned properties, but these operating systems do not operate in real time as such, wherein they cannot be used for predicting maximum response times for running certain operations. The size of such operating systems is typically of the range 200 kB to some MB, wherein it is not necessarily easy to adapt them in a portable machine, such as a mobile station.

Real time operating systems, and particularly operating systems developed for data processing devices have partially opposite requirements, wherein it is difficult to accomplish an operating system with the same programming interface towards the operating system and, simultaneously all the necessary properties, such as small memory consumption and real time characteristics.

Recently, also electronic devices have been developed having both a data processor and a telecommunication device in combination. Such devices are in the present specification called communication devices. One example of such a device is Nokia 9000 Communicator, which is a portable device with a relatively small size having both data processing operations and mobile station operations. However, one object of this type of combined device has been to utilize a previously developed product as much as possible, wherein an aim has been to retain e.g. the software for these different devices compatible in this new device. This has been achieved by providing the data processing portion with a processor of its own and an operating system of its own therein, and likewise, the mobile station embodiments have a processor of their own and an operating system of their own. Thus, it has been possible to utilize the results of earlier product development as efficiently as possible and precipitate the launching of the device. However, separate processors usually spend more capacity than is possible to obtain in a single processor solution, wherein such a portable device needs a more efficient battery, or else its execution time cannot be made as long as is possible by separate devices.

Running two operating systems in a single processor is in prior art solutions accomplished by implementing the operating systems by utilizing the features of either operating system. This type of combination has e.g. the problem that when the operating systems have very different types of properties, it is not possible to carry out all the properties of the operating systems that are to be combined. This causes e.g. the disadvantage that all the application programs developed for these operating systems cannot be used, or the use requires changes in the application programs. Further, when new applications are developed, the application programs made on the basis of one operating system has to be changed in accordance With another operating system. This adds to the work needed and the possibility of mistakes.

Further, U.S. Pat. No. 5,278,973 discloses a data processor where in one processor several operating systems can be used. However, of these operating systems only one can be used at a time. The change of the operating system requires that the execution of the operating system in use has to be called off and the data processor has to be reactivated.

SUMMARY OF THE INVENTION

One object of the present invention is to attain a communication device wherein by one processor or the like operations of at least two operating systems can be executed. The communication device according to an advantageous embodiment of the present invention comprises at least one user interface, mobile station functions and data processing functions, and that of said at least two operating systems the first operating system relates to running of mobile station functions, and the second operating system relates to running of data processing functions.

The present invention provides considerable advantages over solutions of prior art. The capacity spent by one processor is typically lower than if separate processors were used for each operating system. In addition, the need for space is diminished because more common components can be used, such as the memory. The embedded system according to the invention makes it possible to use developed application programs without the need to make changes therein, and new applications can be further developed for either operating systems without the need to first change the application program developed on the basis of one operating system in accordance with the other operating system. The present invention further diminishes the amount of work and possible mistakes when compared to solutions where two operating systems are combined to utilize the features of either operating system, and solutions where each operating system has a processor at its own disposal. In addition, the solution of the invention does not loose any features of operating systems which can still be optimized in a certain application or application area, e.g. for the implementation of mobile station functions.

Further, in portable devices due to diminished power consumption, a longer operation time is provided by a single battery charge.

DESCRIPTION OF THE DRAWINGS

In the following, the present invention will be described in more details with reference to the accompanying drawings, where FIGS. 6a to 6i illustrate different situations of handling interrupts in the embedded system according to a preferred embodiment of the invention.

DETAILED DESCRIPTION OF THE INVENTION

Figure 2:
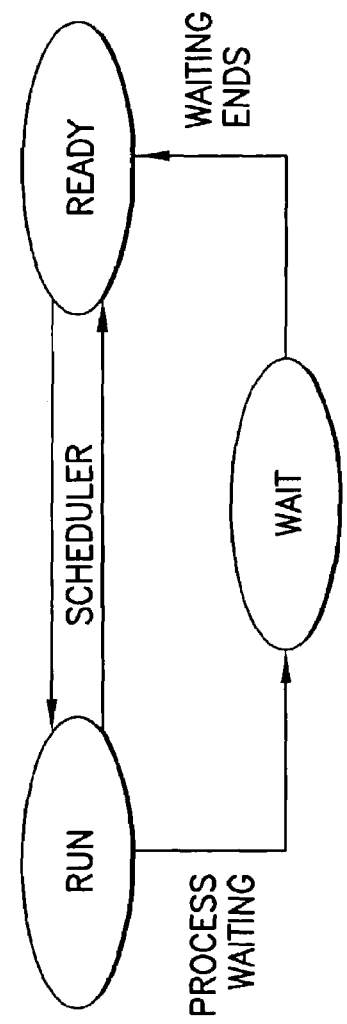
FIG. 2 illustrates one state model of processes.
Figure 3:
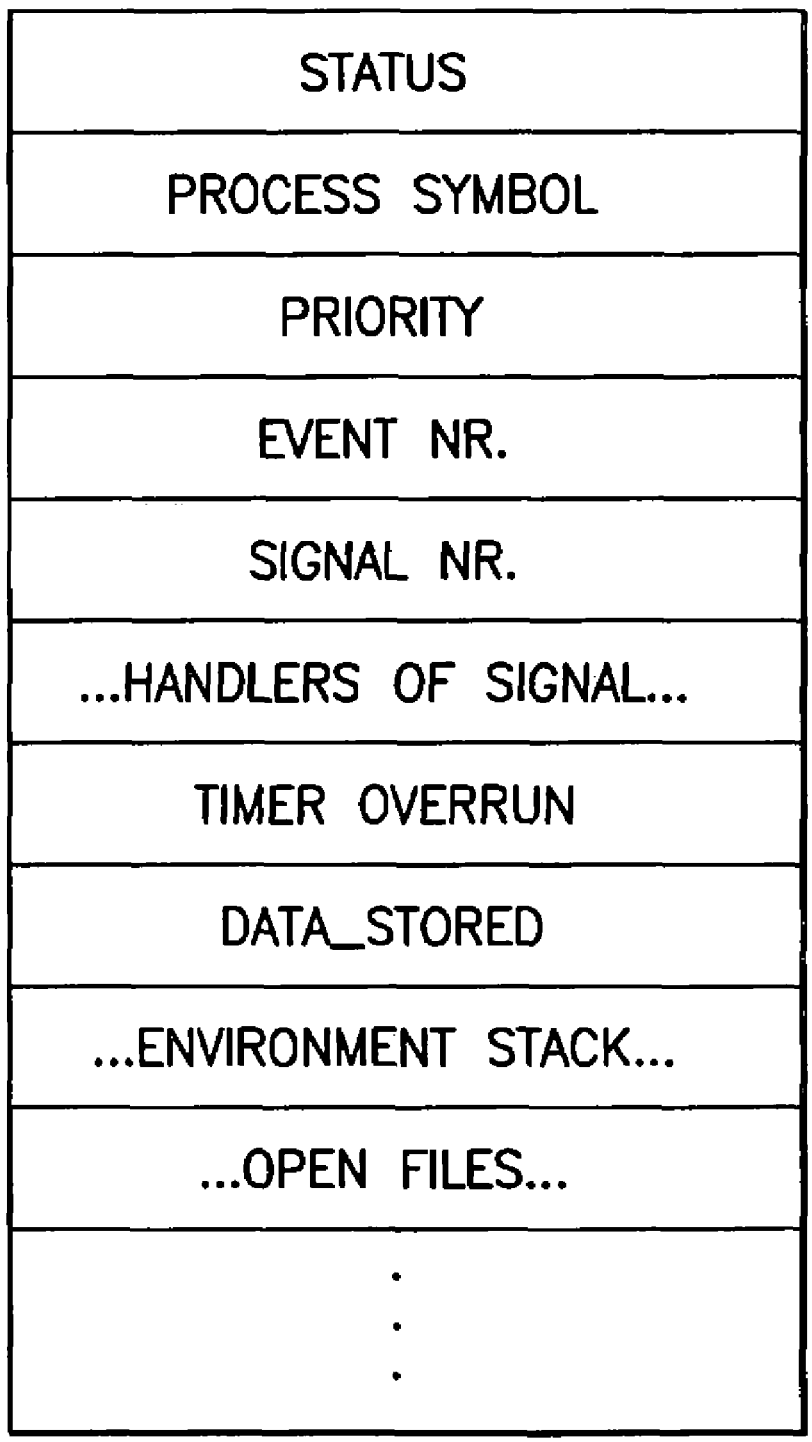
FIG. 3 illustrates an example of a process element.

In order to provide a better understanding of the invention, prior art processor and operating system solutions are first described with reference made to FIGS. 1 to 3.

Processors can, according to the instruction set, be divided into two classes: complete instruction set computers (CISC) and reduced instruction set computers (RISC). In reduced instruction set computers a part of the less common instructions has been eliminated, e.g. the number of addressing forms can be smaller than in complete instruction set computers. However, in ordinary application programs a very small amount of instructions is used for bringing about an application program, wherein it is usually possible to implement the necessary application programs by reduced instruction set computers. An advantage in reduced instruction set processors compared to complete instruction set computers is e.g. the fact that the execution speed can be increased and, on the other hand, the memory space required by the program code is smaller than when a complete instruction set computer is used. In particular, when the amount of the program memory decreases, also the need of capacity for the device decreases and, on the other hand, also the size of the device can be diminished.

In practical embodiments often a microcontroller is used, which comprises an actual processor and auxiliary components connected thereto, such as random access memory (RAM), read only memory (ROM), input/output devices (I/O), timers, analog/digital converters (A/D converters), digital/analog converters (D/A converters) etc. Thus, the interface lines between these different units can be made as small as possible, wherein the size of the device can be diminished further and, on the other hand, the transmission of signals can be accelerated between these different units. Microcontroller manufactures produce several different types of microcontrollers, which can have a same processor but the amount and type of peripheral components can vary, wherein each application can, if needed, be provided with a microcontroller that suits best thereto.

As mentioned earlier in the present specification, for such devices utilizing a microprocessor or a corresponding processor, the operating system is developed to operate as a so-called basic software. This operating system attends to the control of the different units of the device, reading of data, etc., and enables the use of application programs in such a device. E.g. in a personal computer, when the computer is turned on, the operating system is loaded in the program memory, which executes certain initializing operations. Subsequently, the user can start a wished application program, wherein the operating system receives the command given by the user, searches the application program, loads it into the program memory and starts the application program. In multiprocessing systems it is possible to use ostensibly simultaneously several of such application programs, wherein the application program takes care of providing the execution time and scheduling between these different application programs. In addition, the task of the operating system is to transmit signals between these different application programs and, if needed, to arrange signalling between the application program and the peripheral device.

Operating systems can control the execution of processes also as so-called threads. One thread can comprise functions related to the execution of one or several processes and, on the other hand, one process can be divided into one or more threads. The execution of the threads is controlled by a scheduler of the operating system. By other words, the thread is a sort of support given to the process by the operating system.

In known operating systems usually the following properties can be found: a command interpreter, which interprets the command given by the user, e.g. reads the name of the application program in the command and recognises the parameters the user has possibly given to be transmitted by this application program, a scheduler which attends to the allocation of resources to different processes, interrupt request services having the task of reacting to interrupts and to execute the measures required by the interrupts, e.g. a transmission of interrupt request to the operating system. In addition, the operating system has functional blocks, e.g. for reading the keypads, for writing on the display, for functions controlling possible external interfaces, etc. Resources include e.g. a main memory, peripherals and the use of processor time. The operating system e.g. reserves a memory area for each process to be executed, wherein the process can write data and wherein the process reads data. In case some process attempts to write outside this memory area reserved for the process, the memory control unit usually prevents this writing and typically stops the operation of such a process.

Many processors still have in use different modes, such as a user mode and a privileged mode (also supervisory mode or kernel mode). The application programs and other processes initiated by the user are usually set to operate according to the user mode. In contrast, the operating system and a part of the processes started by it operate typically in a privileged mode. The user mode has more limited operating possibilities, e.g. a part of the commands of the processor operate only on privileged mode, wherein they cannot be used on user mode. In some operating systems the privileged operating mode has several levels, e.g. three levels. The kernel of the operating mode is implemented in the first level of the privileged mode, which also has the largest rights. The second level has e.g. the control routines and the like (Executive). The third level has e.g. a command interpreter.

A processor 2 comprises generally the possibility to use interrupts. From outside the processor 2 an interrupt request can be transmitted on one or several interrupt service line nIRQ, nFIQ (FIG. 4b), a change in the mode of which, e.g. from the logic mode 1 to the logic mode 0, can cause an interrupt to the processor 2. An interrupt request to the processor 2 sets the processor 2 to turn to run a respective interrupt service routine, either substantially without delay or when no higher-priority interrupt requests are waiting. In the interrupt service routine at least a part of the interrupt handling operations are executed. These handling operations depend e.g. on the respective applications and the cause of the interrupt. Since the operation of the interrupt service routine decelerates the operation of the running processes and the operating system, an attempt is made, in particular in real time operating systems, to make the interrupt service routines as short and fast as possible. Thus, in an interrupt service routine it is possible to set for the operating system e.g. a state variable informing of the interrupt and of the information that a part of the interrupt handling measures is waiting for execution, wherein the operating system controls the execution of these operations e.g. in accordance with its scheduling procedure. The transmission to the interrupt service routine can also be affected by various interrupt blockings and maskings. When the interrupts are disabled, the interrupt request are usually left waiting for the cancel of interrupt blockings, whereafter the interrupt requests are served advantageously according to their priority. Interrupts can in most processors 2 be prevented also selectively, wherein in the interrupt mask register or the like each interrupt is provided with an enabling or disabling state.

Interrupt requests are generated e.g. on the basis of a signal given by an external device, e.g. a serial-bus interrupt request caused by an information received through a serial bus, an interrupt request caused by pressing a key of the keypad, an interrupt request caused by a timer, or a so-called program interrupt request formed in some executing process. A priority can be determined for interrupts, wherein the execution of an interrupt service routine with a lower priority classification can be interrupted by an interrupt with a higher priority classification. In contrast, an interrupt service routine with a higher level cannot usually be interrupted by an interrupt request with a lower level. For attaining basic timings for the operating system, usually a timer is used, which in certain intervals generates an interrupt request to the processor, which then changes to perform an interrupt service routine of the timer. Consequently, a possibly high priority is given to the interrupt service of the timer. In contrast, e.g. the updating of a display is usually provided with a lower priority.

U.S. Pat. No. 5,515,538 describes one method for handling interrupts in a multiprocessing operating system of a data processor. In the method, an interrupt handler is arranged to form a thread of its own, to which the execution is directed in an interruption situation. However, the method introduced in the publication is regarded only for apparatus of one operating system, which can include simultaneously several processors for running the processes of this operating system.

In the following, the operation of one multiprocessing operating system will be described in reduced form. The scheduler of the operating system examines at certain intervals which application programs, i.e. processes, are to be executed at the time. The scheduler is activated e.g. by means of timer interrupt. Each application program can further comprise one or several threads, wherein each thread is run in a single-processor system at a different time. One thread can e.g. be reading of the data on a peripheral interface, such as a keypad, a second thread can be processing the data, a third thread can be e.g. writing the processed data on a peripheral, such as a display. When this application program is started, the scheduler has defined an execution time for each thread at a time, as well as a repetition interval for running the threads. Thus, the scheduler starts the execution of the thread and, after the execution time has passed, transfers the thread to wait and, if needed, stores the data of the thread into memory means and starts the execution of a new thread, which can be of the same or different process. After the scheduler has executed every thread, the scheduler starts a new execution round or, in case the execution interval of no thread has been fulfilled, a so called idle thread is carried out. However, during the execution time of the above-mentioned threads, interrupt requests can occur, wherein on the basis of the priority of these interrupt requests the operating system can turn to perform the interrupt service routine or the scheduler determines a suitable time for carrying out the interrupt service and continues to perform the interrupted thread. E.g. in an interrupt situation attained by a keypad interface, the keypad interrupt program reads the code of the pressed key and stores it into a temporary memory location. After the interrupt service routine is finished, the scheduler of the operating system determines an execution time for an examining program of the key pressing and returns to the interrupted program thread, in case the priority determined for the keypad interrupt did not exceed the priority of the interrupted program thread.

Figure 1:
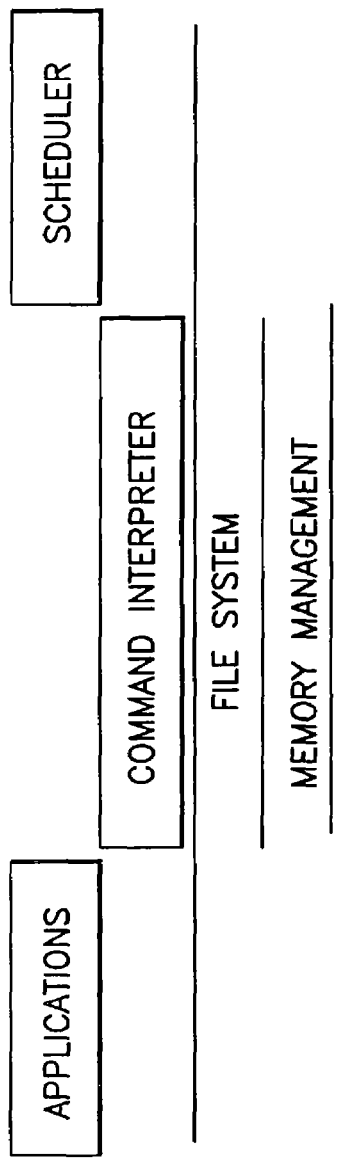
FIG. 1 illustrates the layer structure of one operating system.

The accompanying FIG. 1 illustrates an example of the layer structure of one operating system. The lowermost in the operating system is the kernel, the following level comprises the portions related to the memory control and the third level comprises the file system portions. Above these three levels are positioned e.g. a command interpreter, processes (not shown), interface programs, scheduler functions, etc.

In the following, the structure of the kernel of one operating system is illustrated. The main parts for the operation of the kernel are interrupt handling, control of processes and control of peripheral devices. The interrupt handling includes storing the data of an interrupted program and controlling the execution to the correct interrupt service routine. The control of processes attends e.g. to creating of processes, determining the execution time (scheduling), ending the operation of the process, timing, etc. The control functions of the peripheral devices include e.g. starting the data transmission and handling one or more interrupts related to each peripheral device. In view of the operating system, the process is always in .one of the three modes: ready mode, run mode or wait mode. This mode division is illustrated in the accompanying FIG. 2. The run mode comprises the processes that are carried out at the time, systems comprising one processor have at a time one process at maximum in this mode. Those processes that wait to be executed in the run mode are in the ready mode. The task of the scheduler is to select one process of the ready mode to be carried out in the run mode. The wait mode comprises such processes which are waiting for some operation, such as pressing of key, reallocation of some resource, etc.

The scheduler transfers the process with the highest priority from the ready mode to the run mode. In the run mode, the process moves to the wait mode typically by its own request, e.g. by requesting some operating system service whose implementation includes waiting. Moving from the wait mode to the ready mode takes place when said waiting is ending. The process can be transferred from the run mode back to the ready mode also in a situation in which the scheduler changes some other process to be carried out e.g. to finish the interrupt handling.

The implementation of the kernel usually involves a multitude of dynamic information structures, typically two-way chain lists, whose elements are allocated from the free memory space located in the area of the operating system. E.g. the data of each process is maintained advantageously in a process control block (PCB). The process elements have been collected on a process table, the size of which sets the upper limit to the quantity of processes in the system. The present example, which is illustrated in the accompanying FIG. 3, comprises e.g. the following information in the basic elements:

Process status: Wait, ready to run or run,
name of the process,
priority of the process,
status for the storage (stack) of information (environments) of interrupted processes,
data of allocated resources: memory, devices, open files etc.,
fields related to the tracking of process allocation, and
fields related to authorisations.

It should be mentioned that this serves only as an example of the implementation of a process element, but in practical embodiments these can vary to a great extent and the data in the process elements can be very different.

A process symbol is the name of the process, e.g. a sequence number. On the basis of the name of this process the operating system divides different processes from each other. In case the process comprises more than one thread, the process symbol, or other fields of the process element can include the information of also this number of the thread. For informing the status of the process, a status field is used. Thus, the operating system changes the value of this status field when the state of the process changes. The scheduler uses the value of the Priority field in order to determine the execution sequence of the processes, wherein e.g. the greater the numerical value comprised in this field the higher the priority of the process. Thus, by comparing the value of the Priority field of the processes in wait mode the scheduler selects the process with the highest priority value to be the process to be carried out next.

In the following, the creation of a new process is described. In the present example a process is stored into a file in the memory means of a device, e.g. in a writeable mass memory. This program is recognised according to the file name. The kernel of the operating system comprises a service routine for activating the process, the name given to this service routine as a parameter being advantageously the name of this file. The activation service routine forms on a process table a process element for this process and allocates an area of the main memory to the process. The contents of this program file is read in a memory area reserved for it, the fields of the process element are initialised with suitable values, whereafter the process can be set up to wait for execution. The symbol used for the process can be e.g. the following free process symbol. The status of the process is advantageously set to the value ready. The scheduler of the operating system controls these processes to the execution in accordance with its scheduling procedure.

In operating systems in which processes are executed as threads it is possible to adapt the above-described process creation respectively in a manner that an activation service routine forms one or several threads from the process and forms process elements for the threads on the process table.

Further, the operation systems involve one substantial feature in order to control peripheral devices: so-called device drivers. A device driver comprises routines and information structures needed for controlling a peripheral device, such as a display, a keypad, a codec, etc. The routines needed are e.g. initialising operations of the device, reading/writing, control routine, such as setting the properties of the terminal, and the routine which handles interrupts related to the device. Variables and information structures related to the device can be collected e.g. on a so-called device descriptor. Information of this type can be e.g. the following:

Work queue in which parameter blocks of transfer requests queuing to the device are chained. In case simultaneous value and writing is possible, there are two work queues. The parameter blocks comprise parameters of the transfer request, e.g. information related to the location of a data buffer, the number of the block to be transferred, etc., addresses of device driver routines, variables and mode data of the device required in the transfer control, and device specific parameters.

In some systems the device drivers are the processes of the operating system. The processes operate in an eternal loop where they first wait for a transfer request message. Subsequent to receiving such a message, the device driver process activates the transfer and waits for an interrupt message. The interrupt handler of the operating system attends then to the transmission of the interrupt message to the device driver process. In practical devices the device driver process has typically a high priority and the kernel of the operating system operates in real time.

When reading from a writeable mass memory, the reading operation operates e.g. in the following manner. From a device table it is first searched the address of the respective device descriptor. After this, the address of the reading routine is fetched from the device descriptor and it is requested. The reading routine forms from the parameters of a transfer request a parameter block. If transfer is presently taking place by means of said device, i.e. the device is occupied by another process, the parameter block is chained to be the last in the work queue and waiting takes place. If the device is free wherein the work queue is empty, the parameter block is chained to be the first in the work queue. Subsequently, the number of the block is changed to numbers of the sheet surface, track and sector and the transfer is activated e.g. by modifying the device registers. After this, the ending of the transfer is waited. After the transfer has ended, a device interrupt takes place. The interrupt handling of the operating system searches according to the device number from the device table the address of the device descriptor and therefrom further the address of the interrupt treatment routine and changes over to perform the program code of the interrupt handler. The interrupt handler advantageously checks that no mistakes have taken place. To an end to a successful transfer the parameter block is chained off from the work queue and the process that has been waiting for a transfer is awoken. In case queuing transfer requests exist on the work queue, the next transfer operation is activated substantially without delay.

Depending on the type of the peripheral device, the operation can to some extent vary from what has been described above. By character printing devices, such as displays and printers, the work queue can be replaced simply by a queue containing characters to be printed.

Many operating systems have message transmission mechanisms in use, whereby the processes can transmit messages to each other. When using message queues, one or several message queues are related to the process, in which the messages to be transmitted to the process can be written. Usually bufferings are related to communication between processes, wherein the transmitter of the message does not have to wait that the receiver receives the message. Thus, in the writing phase of the message, information (state variable) is set up to inform that a message is waiting for the process, wherein the process reads the message at a suitable phase.

Figure 4A:
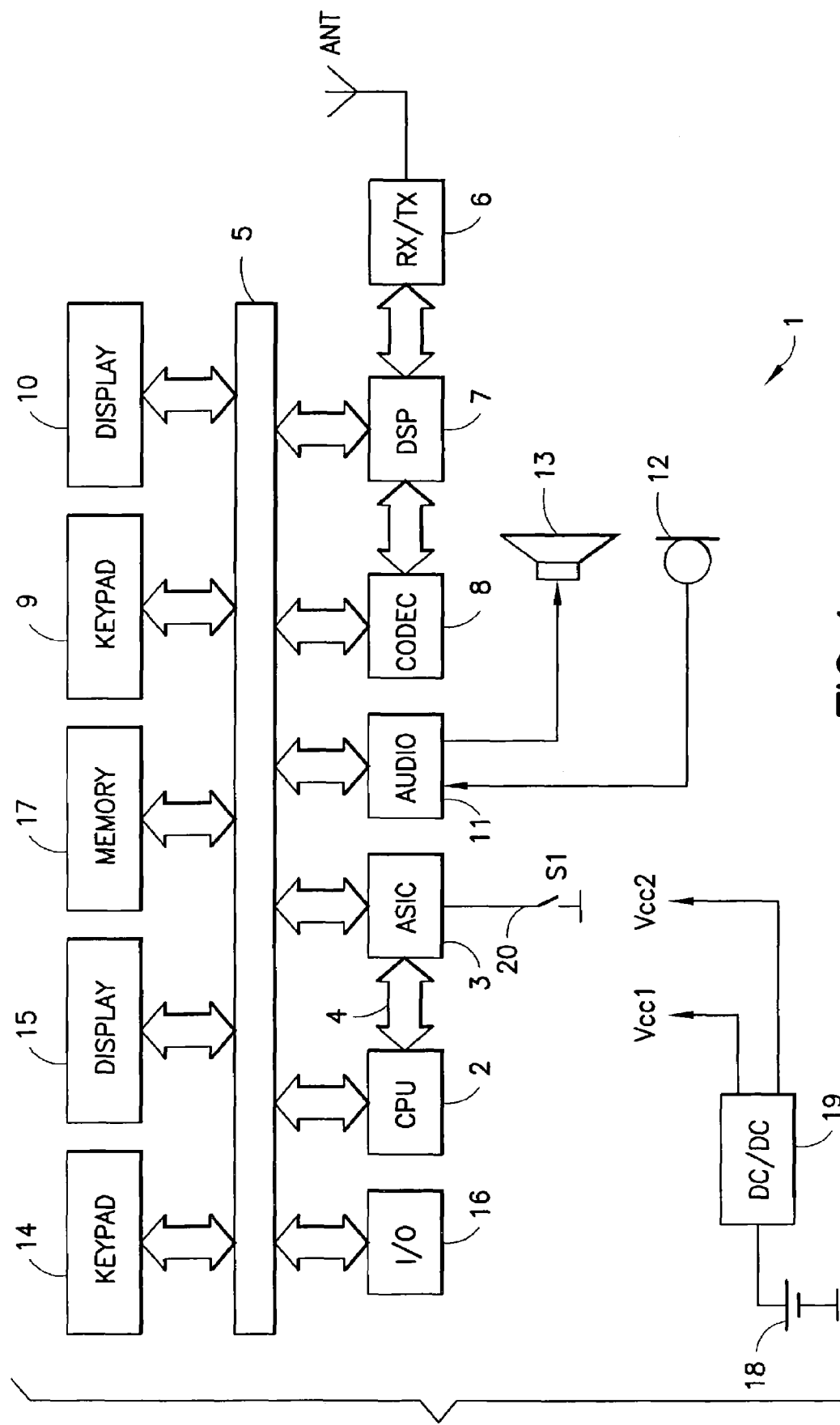
FIG. 4a illustrates a reduced block diagram of an embedded system according to the advantageous embodiment of the invention.

In the embedded system according to a preferred embodiment of the invention, i.e. in a communication device 1 (FIG. 4a) two operating systems are used. A first operating system, which is designated in the present specification with the reference OS_A, is mainly used in the implementation of mobile station functions, and a second operating system, which is designated in the present specification with the reference OS_B, is used mainly to implement data processing functions. Data processing functions refer mainly to functions known from personal computers and the like, e.g. reading of files, writing by a writeable mass memory, printing of data, carrying out application programs, such as so-called organisation functions (notebook, maintenance of contact data etc.) etc. Since it is advantageous to use one processor 2 in connection with the communication device 1, it is necessary that these functions of different operation devices OS_A, OS_B can be connected in a manner that at the same time the features of both operating systems OS_A, OS_B are maintained. Further, one criterion is the real time of functions, when needed. In the following, in the light of examples it is described how these different operating systems OS_A, OS_B can be joined in connection with the same processor 2.

Figure 5:
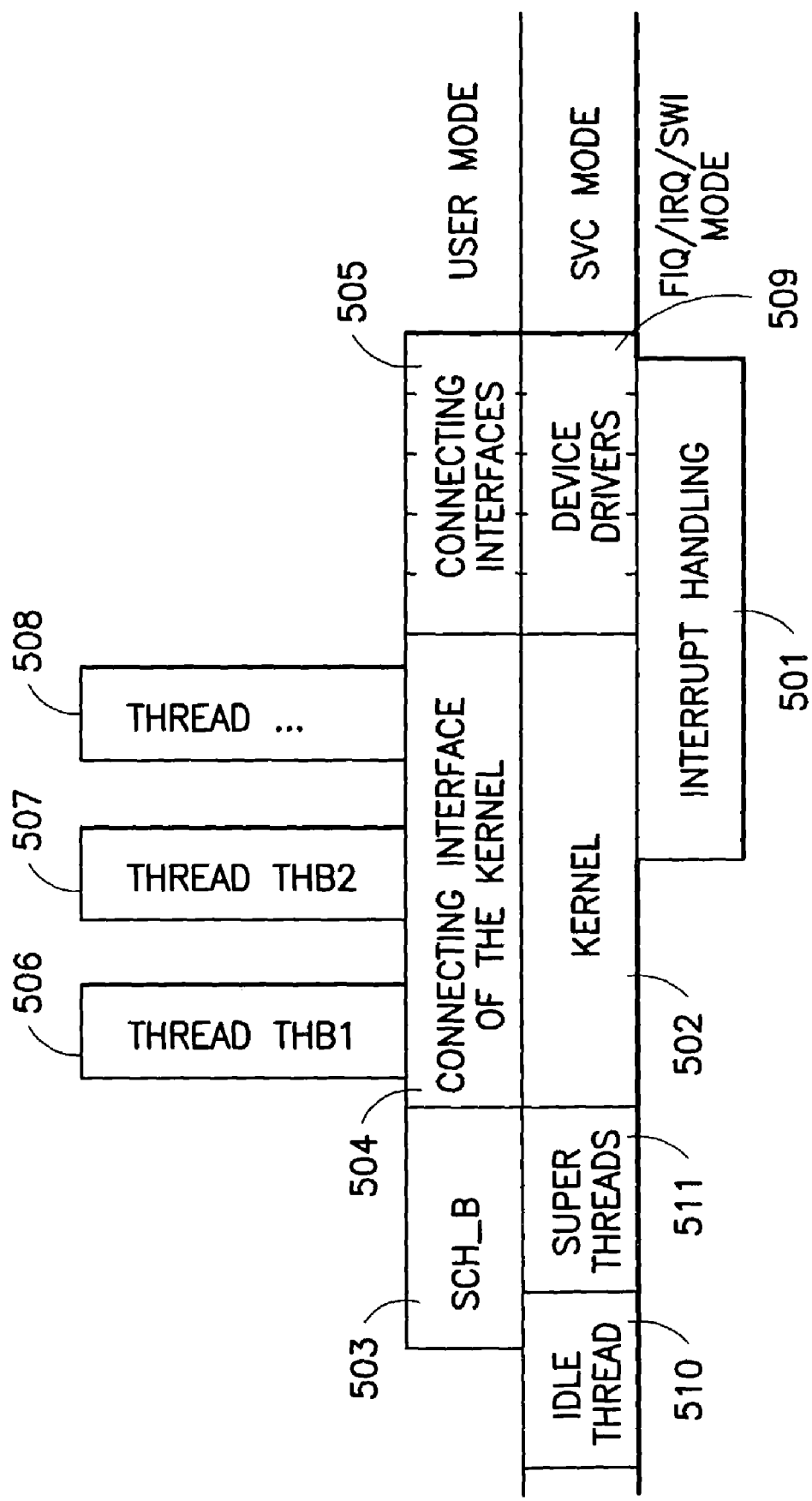
FIG. 5 illustrates a reduced diagram of one operating system architecture used in connection with the embedded system of the present invention.

FIG. 5 illustrates one example of the architecture of the second operating system OS_B. Each block illustrates a certain process, thread, connecting interface etc. The blocks are further divided in accordance with the information whether a user mode USER or a privileged mode SVC is used in said block. A further separated part of its own is the interrupt modes, which in FIG. 6 is illustrated by a block 501. The interrupt modes use a fast interrupt mode FIQ, a normal interrupt mode IRQ or a software interrupt mode SWI. The kernel (block 502) of the second operating system OS_B is set to operate in a privileged mode SVC (Supervisory mode). In contrast, an scheduler SCH_B (block 503) of the second operation system, the connecting interface (block 504), threads (506, 507 and 508) of the user's processes, such as a calendar application of a data processor and the like, as well as connecting interfaces (block 505) of the device drivers are set to operate in the user mode USER, wherein they do not have e.g. access to a stack (not shown) of the operation system or to other crucial memory blocks. The privileged mode further comprises device drivers (block 509), an idle thread (block 510) as well as so-called possible super threads (block 511). The idle thread 510 is some sort of waiting process which the operating system carries out when no other processes are executed. The super thread 511 refers in the present specification to threads having a very small response time compared to the response times of the normal threads 506, 507, 508. The response time of the super threads 511 can be e.g. about some hundreds of microseconds, whereas the response times of normal threads 506, 507, 508 are e.g. some tens of milliseconds. The present invention can also be adapted e.g. in connection with such operating systems which have no super threads 511.

The kernel 502 of the operating system is provided with the highest priority. Due to the above-mentioned response time requirement, also the super threads 511 are provided with a priority higher than that of the normal threads 506, 507, 508. The response time refers here to the time which passes from the arrival of the interrupt request caused by the incident to the time when the running of the thread is started. This response time is an expectation value, but in reality the responses are in normal operation smaller than or, at the maximum, equal to this expectation value. In excessive loading situation, the response time can sometimes exceed the expectation value. The response time also comprises the time which passes for carrying out an interrupt service routine. In practice, it is aimed that the interrupt service routines are formed to be as short as possible, wherein they can be executed faster.

One embedded system according to the preferred embodiment of the invention is illustrated in the accompanying FIG.

4a by a communication device 1. It comprises e.g. a processor 2, which is e.g. a microprocessor or a part of a microcontroller, wherein at least a part of the blocks of the block diagram in FIG. 4a can be formed of the functional blocks of the microcontroller. In addition to the processor 2, a part of the control functions are implemented in this preferred embodiment by means of a so-called application specific integrated circuit 3 (ASIC). There can be a separate data transmission bus 4 between the processor 2 and the application specific integrated circuit 3, wherein data transmission speed can be increased and, on the other hand, a second data transmission bus 5 is not loaded. In order to obtain mobile station functions, the communication device is provided with a transmitter/receiver unit 6, a transmission/receiving antenna ANT, a digital signal processing unit (DSP), a codec 8 for coding/decoding of a sound signal, a first keypad 9 for using mobile station functions, as well as a first display device 10 for displaying information to the user. Further, the communication device 1 comprises an audio block 11 in which it is carried out the necessary analog/digital conversions for an analog signal formed by a microphone 12 as well as digital/analog conversions for the signal directed to a loudspeaker 13. For attaining data processing properties, the communication device 1 is provided with a second keypad 14, a second display 15 and an interface block 16 having e.g. means for connecting a printer in connection with the communication device 1. A generally used common nomination for the keypad 9, 14 and the display 10, 15 is a user interface (UI), by means of which the communication between the user and the communication device 1 can at least partially be carried out. In some applications the user interface can also comprise audio means, such as the microphone 12 and the loudspeaker 13. The communication device 1 according to FIG. 1 illustrates two user interfaces UI1, UI2, a first user interface UI1 comprising a first keypad 9 and a first display 10, and a second user interface UI2 comprising a second keypad 14 and a second display 15. The first user interface UI1 is regarded mainly for mobile station operation and the other user interface UI2 is regarded mainly for data processing operation, but both user interfaces UI1, UI2 can be used both in connection with mobile station operations and in connection with data processing operations, if necessary. The user interfaces UI1, UI2 are not necessarily separate, but they can be implemented also as one user interface having e.g. one display and/or one keypad.

The keypad of the user interfaces UI1, UI2 can also be implemented in a manner that a so-called touch screen is used, wherein, advantageously on top of the display a touch sensitive means is positioned, this means reacting e.g. a touch of the user's finger. The operating principles of the touch sensitive means are known as such and are based e.g. on capacitance changes or resistance changes.

A communication device 1 further comprises memory 17, which comprises advantageously read only memory ROM, e.g. for storing a booting code, random access memory. RAM for loading application programs to be carried out and for storing data during the use, possibly also from a writeable mass memory, FLASH memory and/or non-volatile random access memory NVRAM. The functional blocks of the communication device 1 are connected by a second data transmission bus 5, which comprises e.g. an address bus, a data bus and a control bus. However, for the sake of clarity, these buses are not illustrated separately since this is prior art known to an expert in the field. Power supply is arranged from a battery 18 connected to a voltage forming block 19, which comprises voltage regulators, voltage converters or the like, wherein it is possible, if needed, to form different operating voltages Vcc1, Vcc2. The voltage forming block can further form a signal for lowering the charge of the battery 18 to such a low level that the communication device 1 can cease to operate. Thus, the battery 18 has to be recharged or the operating voltages has to be turned off. In practical embodiments, this information of the charge status causes an interrupt request to the processor 2, wherein in connection with this interrupt service routine a data storing request is set up, wherein advantageously the operating systems OS_A, OS_B form a message to the displays 10, 15 for emptying the accumulator 18 and start to store data into the memory 17. Further, the control for turning off the operating voltages can be carried out automatically.

The communication devices 1 can also comprise other processors, e.g. in some of their peripheral device, but this has no significance to the invention, these being intended for other purposes than for carrying out operating system functions.

Figure 4B:
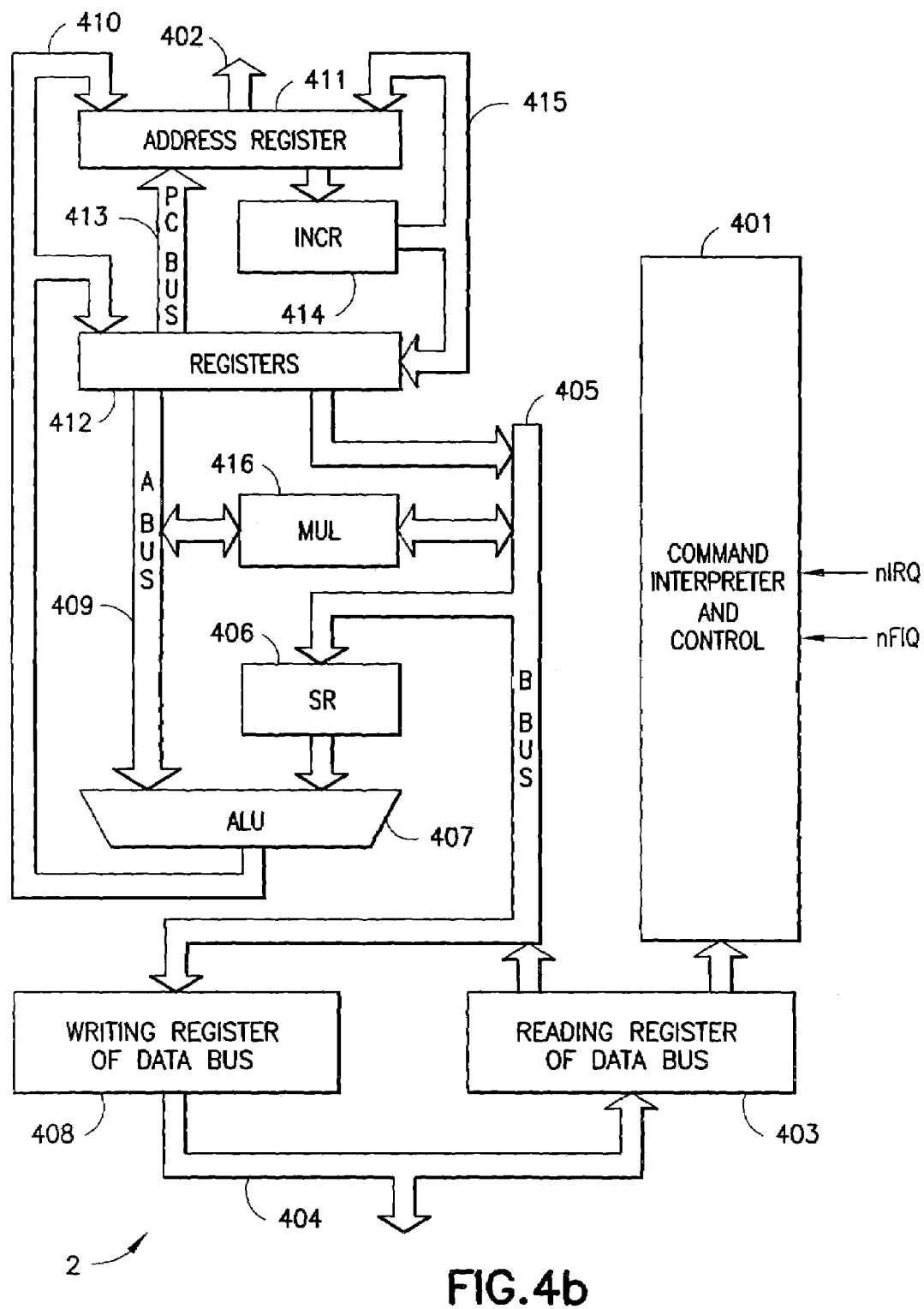
FIG. 4b illustrates a reduced block diagram of one processor.

The processor 2 used in this exemplifying embodiment is a processor belonging to an ARM7 series, manufactured by the firm Advanced RISC Machines. The processor is a so-called reduced command set processor. However, the invention is not restricted only to a this type of processor or to reduced command set processors, but the invention can be adapted also in connection with other types of processors. The accompanying FIG. 4b illustrates a reduced block diagram of one processor of the ARM7 series. In view of the operation of the processor 2, the central block is a command interpreter and control block 401. The purpose of this is e.g. to interpret the program commands and to control the measures required by them, to react to interrupt requests coming through the fast interrupt line nFIQ and the normal interrupt line nIRQ, to software interrupt requests, to form of an external clock signal (not shown) timing signals and the like for the operation of the processor, to form control signals e.g. for reading data and for writing data between the memory 17 and the processor 2, as well as to control the formation of address data needed at the time for the address bus 402.

The reading register 403 of the data bus positions the program commands coming from the data bus 404 to an internal command queue (not shown) of the reading register 403 of the data bus and the data to a data register (not shown). The command interpreter and control block 401 reads in the internal command queue the program command to be carried out next and interprets it. If needed, the command interpreter and control block 401 reads the data from the data register and transfers it to a second internal data bus 405 (B bus), wherefrom it can be transferred via a barrel shifter 406 to an arithmetic logic unit (ALU) 407, whereto also a first internal data bus 409 (A bus) has been directed. In a corresponding manner, the command interpreter and control block 401 controls the writing of data to a writing register 408 of the data bus, wherefrom the data can be transferred to the data bus 404.

In the arithmetic logic unit 407, e.g. summations and subtractions as well as logic operations are executed in a manner known as such. From the arithmetic logic unit 407 data can be transferred along a third internal data bus 410 (ALU bus) to an address register 411 as well as to a data register block 412, having internal data registers (register bank). A data register block 412 comprises registers intended for storing of data, status registers and e.g. a program counter (PC) used for showing program commands from the program memory area, e.g. from the memory 17 of the communication device. For this purpose, an inner address bus 413 has been directed from the data register block 412 to the address register 411.

An address register 411 is connected to an address counter block 414, where the value of the program counter is normally added by one, to point the following place in the program code where the program command to be carried out next in the program code is usually located. In some situations, the program command that is carried out, such as a sub-program request, or an interrupt request causes a transfer to another location on the program code, wherein the command interpreter and control block sets this address to the program counter and transfers it to be the value of the address register 411. From the address counter block 414, an address changing bus 415 has been directed to the address register 411 and to the data register block 412.

The processor 2 further comprises a multiplication block 416 for carrying out multiplications and divisions. The multiplication block 416 is connected to the first 409 and the second internal data bus 405. The above-described processor 2 comprises also other connection lines than those introduced above. However, it is not necessary to describe them in more detail in this context.

A part of the data registers in the data register block 412 of the processor 2 can be used in all the operating modes of the processor, and further, for the different operating modes such data registers have been reserved which have been blocked in other operating modes. By this arrangement, it is possible to reduce the need for storing data in particular in connection with interrupt situations. Further, for different operating modes a specific stack pointer is provided, wherein each operating mode can, if necessary, have advantageously at its disposal an own memory area of the memory 17 reserved for the stack.

The processor 2 can advantageously be set at least to three operating modes: to the user mode in which the use of the resources are districted, to the privileged mode (supervisory mode), wherein all the resources of the processor can be used, or to the undefined mode which is a special mode of privileged mode usually used in situations in which the processor 2 has detected an unidentified command in the program code. In this preferred embodiment, this undefined mode is intentionally used as one mode which will be described later in the present specification. In this processor 2, the undefined mode is useful for this purpose. Some other privileged mode can, if needed, be used as the corresponding mode. Further, for the processor 2, three types of interrupts can be used: fast interrupts (FIQ, Fast Interrupt Request), ordinary interrupt requests (IRQ, Interrupt Request) and programmed interrupts (SWI, Software Interrupt Request). Fast interrupts FIQ have a higher priority level than ordinary interrupts IRQ, which respectively have a higher priority level than programmed interrupts. Thus, in view of the response time, critical interrupts are advantageously arranged by using fast interrupts FIQ.

When activating the communication device 1, an activation program code stored under the control of the processor 2 preferably into the memory 17 of the communication device, preferably into read only memory or non-volatile random access memory, the program commands, e.g. for executing memory checks, being formed in the activation program code. In connection with starting the activation, also the control routines of the files are loaded, wherein the loadings of the program codes of the operating systems OS_A, OS_B into the memory 17 can, if needed, be carried out by means of the control routines of the files. This is known technique in many data processing devices and operating systems. The program codes of the operating systems OS_A, OS_B can be stored also e.g. into read only memory ROM, non-volatile memory NVRAM or in electrically erasable programmable ROM EEPROM. Thus, it is possible to use the operating systems OS_A, OS_B directly from the storage location (XIP technique, execute in place).

After loading the operating systems OS_A, OS_B, they are started. Thus, the first step is e.g. to perform the starting operations of the second operating system OS_B, wherein among other things the process tables, memory areas, interrupt service routines, message queues and other corresponding descriptors of the operating systems are set up, the device drivers and data types are loaded and interrupts are allowed. In the next step, the execution of the corresponding starting operations of the first operating system OS_A is started. When the starting operations of the second operating system OS_B have first been carried out, in the starting operations of the first operating system OS_A e.g. the interrupt functions of the operating system OS_A: the start of interrupt and the end of interrupt, are connected dynamically to the interrupt handlers (e.g. the start address of the functions is set in the memory 17). In addition, an interface is formed to the interrupt handlers for the scheduling of the threads of the first operating system OS_A.

The device drivers carry out among other things the initial settings of the modes of the peripheral devices. A fixed area (static allocation) is preferably reserved for the data memory RAM of the operating systems, in order to better ensure a sufficient execution speed compared to the option that memory areas are, during normal operation, allocated according to the need (dynamic allocation).

Subsequent to the starting operations, e.g. the execution of the idle threads, and possibly the loading and execution of some application program is started. E.g. it is possible to start mobile station functions, wherein the communication device 1 is ready to receive calls, messages, facsimiles, etc. and the user can, if he/she wishes, start up a call, send a message or a facsimile, if these functions are set up in the communication device 1.

In case of an interrupt in the communication device 1 of the invention, the processor 2 moves to carry out an interrupt interpreter or a dispatcher, which stores the state of the interrupted thread. Thereafter, the dispatcher starts the interrupt service routine. Which interrupt service routine will be started depends typically on the cause of the interrupt request. This can be concluded e.g. in a manner that the processor 2 has a state register, whose contents inform of the cause of the interrupt. E.g. as a result of a keypad interrupt, the corresponding bit of the state register is changed to another logic state (e.g. from logic 0 state to logic 1 state), wherein the processor 2 examines the different bits of this register and starts a corresponding interrupt service routine. In a situation, in which several interrupt requests are valid, the interrupt service routine with the highest priority is started first.

Also processors 2 are known, which have several interrupt lines nFIQ, nIRQ at disposal, wherein a state change in the interrupt line nFIQ, nIRQ brings about an interrupt request. A specific interrupt service routine can be defined for each interrupt line nFIQ, nIRQ. Further, the addresses of these interrupt service routines can be in table form, wherein the processor 2 fetches from this table a start address of the interrupt service routine in accordance with the interrupt and sets this as the value of its program counter, wherein the command that will be executed next will be in this address.

In the present invention it is also possible to change some or even all the interrupt service routines defined for the interrupts FIQ, IRQ, SWI. For example, some application programs may define a new interrupt service routine to be used in connection for an interrupt FIQ, IRQ, SWI. When that application program is executed, the processor 2 modifies the interrupt service routines in the memory 17. In some advantageous embodiments of the invention it is also possible that the processor 2 modifies only the starting address of such interrupts which should use another interrupt service routine. The actual code for the interrupt service routine is stored in the memory 17. This means that there exists some kind of address table of the starting addresses of the interrupt service routines. There may exist also other alternatives than presented above to define, which interrupt service routine should be used for an interrupt FIQ, IRQ, SWI.

The necessary operations required in the interrupt service routine are carried out, e.g. reading the keypad buffer and storing data into memory. Additionally, the interrupt service can form a signal to be transmitted to some thread or operating system. A more detailed description of the operation of the communication device 1 according to the preferred embodiment of the present invention will be described later in this specification.

The response time of the interrupt services is typically even smaller than the response time of the above-mentioned super threads 511, e.g. ca. 100 microseconds. Factors having an effect on this response time of the interrupt service include e.g. the fact how long the interrupts have been disabled in some part of the program code. Interrupt cancels can relate either to all interrupts, to interrupts having a priority level lower than a specified level, or the interrupt can be temporarily cancelled through the mask register of interrupts or the like. Thus, the interrupt request remains in the memory and the interrupt service routine is executed at the phase when the interrupt cancellation has been removed for this interrupt request and no threads having a higher priority level are carried out.

Transfer from the first operating system OS_A to the second operating system OS_B can take place when no threads of the first operating system OS_A are being executed. Thus, in view of the first operating system OS_A the execution takes place in the idle thread.

During the operation of the communication device 1 it may be necessary to transmit information also between applications operating in different operating systems OS_A, OS_B. This is necessary in particular in situations in which both operating systems OS_A, OS_B use at least partially common resources. E.g. the keypads 9, 14 can comprise common keys or instead of separate keypads 9, 14 a common keypad can be used. On the other hand, it is often sensible to attend to the control of such resources by means of one device driver, in which own connecting interfaces have been arranged from the different operating systems OS_A, OS_B. This facilitates also the control of such situations in which more than one operating system OS_A, OS_B attempts to use the same resource simultaneously.

In the following, the operation of the communication device according to the invention is described, in view of the different operating systems OS_A, OS_B. In this preferred embodiment of the invention, the first operating system OS_A is a so-called real time operating system, wherein certain execution time requirements have been determined for it. The second operating system OS_B is not as critical as to its execution times, but, particularly in view of use comfort, also the second operating system OS_B has to perform the operations set for it within a reasonable time.

The threads of the first operating system OS_A have a priority determined for them e.g. at the design phase of the embedded system. By utilising the priority it is possible to affect e.g. the execution order and response times of the critical threads. The scheduler SCH_A of the first operating system sets the thread with the highest priority at the time to be the first to run in the execution round. In practical system, this means that the processor 2 of the communication device 1 according to a preferred embodiment of the invention performs the scheduling function of the first operating system OS_A, which has been implemented by the program commands of the processor 2. When running the threads, the processor 2 carries out measures according to the program commands programmed in the thread.

After having executed all the threads THA1, THA2 of the processes running in the first operating system OS_A, the processor 2 moves to perform operations of the second operating system OS_B, e.g. delayed function calls DSR (Delayed Service Routine) or threads THB1, THB2 that are waiting. The threads THA1, THA2 of the first operating system OS_A are always authorized to operate, except for short breaks during the interrupt handling. A description of this is provided later in the present specification. In this preferred embodiment of the invention, the execution of the second operating system OS_B corresponds, in view of the first operating system OS_A, to the execution of the first thread of the first operating system OS_A, such as the idle thread THA_IDLE or the super thread. In order to attain this, the first operating system OS_A is provided with an information structure (not shown) representing the idle thread THA_IDLE, although the first operating system OS_A comprises no proper idle thread in the implementation of the present embodiment.

After having moved to carry out the second operating system OS_B, the processor 2 performs the scheduling functions of the second operating system OS_B on the basis of the priorities and scheduling practises of the running threads THB1, THB2 of the second operating system OS_B. First, the delayed service routines DSR are executed, in case some of these are waiting, and thereafter the execution of the threads THB1, THB2 is started, preferably according to priority order. After carrying out the threads THB1, THB2 that were to be executed, wherein no thread THB1, THB2 is under the run mode, the processor 2 moves to an idle thread THB_IDLE of the second operating system OS_B, remaining there until there is need for a new execution round.

During the execution of the second operating system OS_B, a change to the first operating system OS_A can take place almost at any phase. This takes place advantageously in a manner that due to an interrupt request the processor 2 moves to perform the interrupt service routine, where the first operating system OS_A is activated in a manner presented later. The return to the second operating system OS_B takes place in the phase when the execution in the first operating system OS_A has proceeded to the idle thread THA_IDLE. The execution of the first operating system OS_A is thus, in view of the second operating system OS_B, running the interrupt service routine.

It has been an aim of the present invention to implement the connection of the operating systems OS_A OS_B in a manner that the changes in the program codes of different operating systems OS_A, OS_B are as small as possible, and on the other hand in a manner that the properties of the operating systems OS_A, OS_B do not change to a significant degree in view of the application developer. In the communication device according to a preferred embodiment of the invention, the connection has been made on the interrupt service routine level. When a device interrupt FIQ, IRQ or a program interrupt SWI occurs, the processor 2 moves to perform the interrupt service routine. This program can either be common to all interrupts, wherein by studying the registers or the like the command interpreter and control block 401 of the processor 2 can, if needed, conclude the cause of the interrupt, or there can be several different interrupt service routines for different apparatus interrupts FIQ, IRQ or program interrupts SWI. At the beginning of the interrupt service routine, there is a program call (function call) added to the interrupt begin routine, in which the internal status of the operating systems OS_A, OS_B is changed, wherein the data in the operating systems OS_A, OS_B informs that the interrupt service is running. Transfers to the interrupt service routine, execution of sub-programs, study of state data, as well as other corresponding operations are carried out under the control of the command interpreter and control block 401, which has been described earlier in the present specification and is, on the other hand, technique known by an expert in the field.

Subsequently, the functions of the interrupt handler are carried out, which means that the command interpreter and control block 401 performs the program commands determined for the interrupt that has come to the processor 2, these program commands being preferably stored into the memory 17. In the interrupt handler it is e.g. studied what has caused the interrupt and concluded whether the interrupt handling requires the execution of the threads of the first OS_A or the second OS_B operating system. If the respective interrupt handling requires the execution of the first operating system OS_A, the interrupt handler sets information of this to the scheduler SCH_A of the first operating system. If the interrupt handling requires the execution of the threads of the second operating system OS_B, the interrupt handler forms a delayed service routine DSR to be carried out after the execution of the threads of the first operating system OS_A. Such a delayed service routine DSR can be formed also through the running threads of the first operating system OS_A. This delayed service routine DSR can inform the scheduler SCH_B of the second operating system that the interrupt handling requires the execution of the certain threads in the second operating system OS_B. In some situations, it is also possible that the interrupt handler sets this data to the scheduler SCH_B of the second operating system without delayed service routines DSR being used.

In the interrupt service routine it is also possible to perform other operations, such as reading data into a buffer in which the data is read at the phase when the thread of the application program to which the data is addressed is at the execution phase.

At the end of the interrupt program, an interrupt end function request has been added, in which there is set e.g. the information that the execution of the interrupt service routine has ended. Further, the function returns the information whether in the interrupt service any routines of the first operating system OS_A have been carried out, which require an execution time from the scheduler SCH_A of the first operating system OS_A to the threads. After the end of the interrupt service routine, the mode of the processor 2 and the status of the first operating system OS_A are changed. In case the interrupt handling caused a need to perform the threads of the first operating system OS_A, the next program that is executed is the scheduler program of the first operating system OS_A, in which a new status (READY) is given to the thread to which the interrupt caused measures, e.g. reading information in the buffer. The scheduler SCH_A of the first operating system OS_A controls for execution, according to a priority order, those threads of the first operating system OS_A which are waiting for execution (in READY status).

In the threads of the first operating system OS_A which are in the interrupt service of the first operating system OS_A or running it is possible in some situations to form delayed service routines DSR, wherein the status of the threads of the second operating system OS_B are changed. The delayed service routines DSR are handled after the processor 2 has executed all the threads of the first operating system OS_A which were waiting for execution. Subsequent to the handling of the delayed service routines, the scheduler routine of the second operating system OS_B is further carried out in order to run those threads which are waiting for the execution of the second operating system OS_B advantageously according to a priority order.

During the execution of the above-mentioned measures a new interrupt can occur, wherein the operation is once again transferred to the interrupt handling, the subsequent operations taking place according to the principles presented above.

The operation that takes place after the interrupt is continued in a manner that the operation having the highest effective priority at the time is run. This is influenced e.g. by the phase the processor 2 was running at the moment of interrupt and also by the cause of the interrupt. Some alternative situations are illustrated in the accompanying FIGS. 6a to 6i, which in the following will be described in more details. An example of an embedded system 1 is a communication device in which both mobile station functions and data processing functions have been implemented, such as functions of a personal digital assistant PDA. In the processor 2 of the communication device, two operating systems OS_A, OS_B are used. The first operating system OS_A is primarily regarded for the control and use of mobile station functions. The second operating system OS_B is regarded mainly for the control and use of data processing functions.

In the exemplifying situations of FIGS. 6a to 6h, the situations concern a so-called normal interrupt IRQ (Interrupt Request). In this communication device 1 according to a preferred embodiment of the invention also a so-called fast interrupt FIQ (Fast Interrupt Request) can be used, which is illustrated in the example of FIG. 6i. The priority of a fast interrupt is advantageously higher than that of the normal interrupt IRQ. In addition, also a software interrupt SWI is available, which has a priority advantageously lower than that of the normal interrupt IRQ. The phases illustrated in the accompanying FIGS. 6a to 6i can also be adapted in fast interrupts FIQ and in programmed interrupts SWI, so in the present specification primarily only normal interrupts IRQ are discussed.

The delayed service routine is a property of the second operating system OS_B which can be used e.g. in message transfer between different threads and, if needed, also between different operating systems OS_A, OS_B. The delayed service routine DSR changes the status of the thread of the second operating system OS_B to waiting state for execution (READY state). The priority of the delayed service routines DSR in the second operating system OS_B is higher that of the threads, so they are handled before the threads of the second operating system OS_B are run.

The processor 2 comprises in this example the following modes:
  user mode USER
  privileged mode SVC
  undefined mode UND fast interrupt mode FIQ
normal interrupt mode IRQ, and
software interrupt mode SWI.

The undefined mode UND is in this preferred embodiment of the invention used as a normal run mode, although its default valued application in the processor 2 used in the present example is the undefined mode.

Figure 6A:
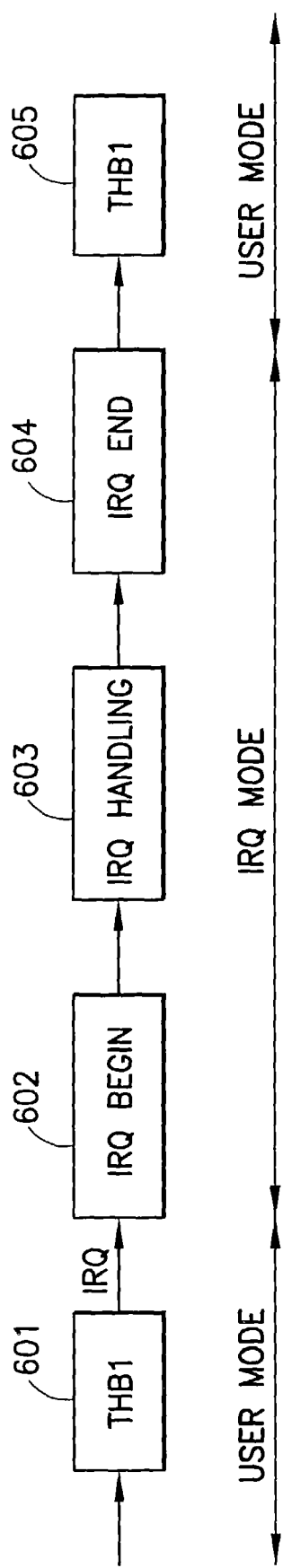

FIG. 6a illustrates a situation in which, in connection with a normal interrupt, the processor 2 performs a thread THB1 under the second operating system OS_B (block 601), which in the data processing function of the communication device 1 comprises e.g. a process related to the application program activated by the user. The processor 2 is in the user mode USER. The normal interrupt causes the mode to change to the normal interrupt mode IRQ, wherein the processor 2 moves to run the begin of normal interrupt function (block 602) and after that the service program of normal interrupt (block 603). The interrupt did not cause any need for running the threads of the first operating system OS_A, wherein the scheduler SCH_A of the first operating system is not called after the interrupt. In the interrupt also no delayed service requests DSR were formed. At the end of the interrupt handling, the end of normal interrupt function (block 604) is called, in which the information that the interrupt has ended is set. After the service program of normal interrupt has ended, the mode of the processor 2 is changed back to the user mode USER. The execution is continued from the interrupted thread THB1 (block 605) of the second operating system OS_B.

The interrupt is caused e.g. by the opening of a lid (not shown) of the communication device 1, wherein a switch S1 indicating the position of the lid changes its status, e.g. it opens, wherein the processor 2 can examine the position of this switch S1 by reading a logic state (0/1) of an identification line 20 connected to the switch. In this case the opening of the lid did not cause any immediate actions.

Figure 6B:
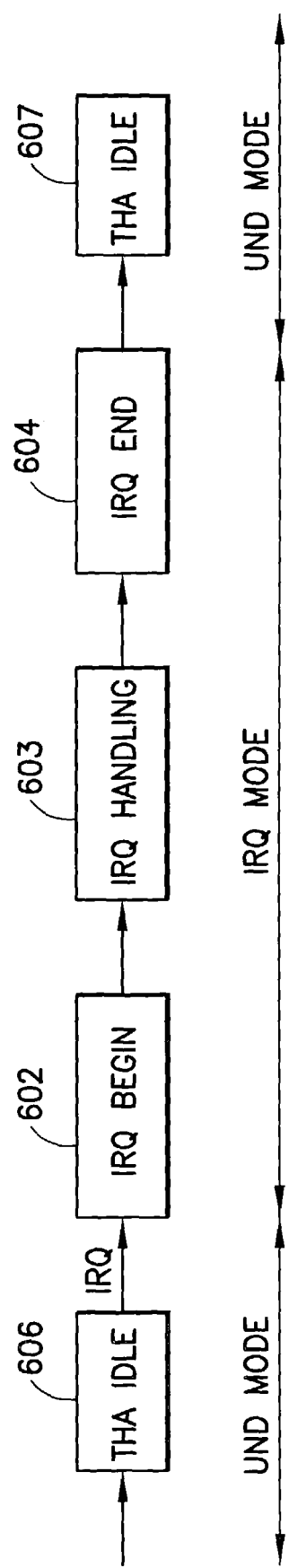

FIG. 6b illustrates a situation, in which, in connection with a normal interrupt, the processor 2 is running the first idle thread THA_IDLE (block 606) of the first operating system OS_A. In this situation the mode changes from the undefined mode UND to the normal interrupt mode IRQ and the processor 2 moves to run the begin of normal interrupt function (block 602) and thereafter the service program of normal interrupt. The interrupt did not cause any need for running the threads of the first operating system OS_A, Wherein the scheduler SCH_A of the first operating system OS_A is not called after the interrupt. In the interrupt, also no delayed service routines DSR were formed. After the interrupt has been terminated, the end of normal interrupt function (block 604) is requested, wherein the information that the interrupt has ended is set up. When the service program of normal interrupt has ended, the mode of the processor 2 is changed back to the undefined mode UND. The execution is continued from the idle thread THA_IDLE (block 605).

The interrupt IRQ is caused e.g. by the user pressing one key of the keypad 14 of the data processing functions with the lid of the communication device 1 in the open position. The interrupt handler examines whether the pressing of the respective key has in this situation any effect on the operation of the mobile station function, and confirms that it has not, wherein the interrupt did not cause measures in the mobile station functions.

Figure 6C:
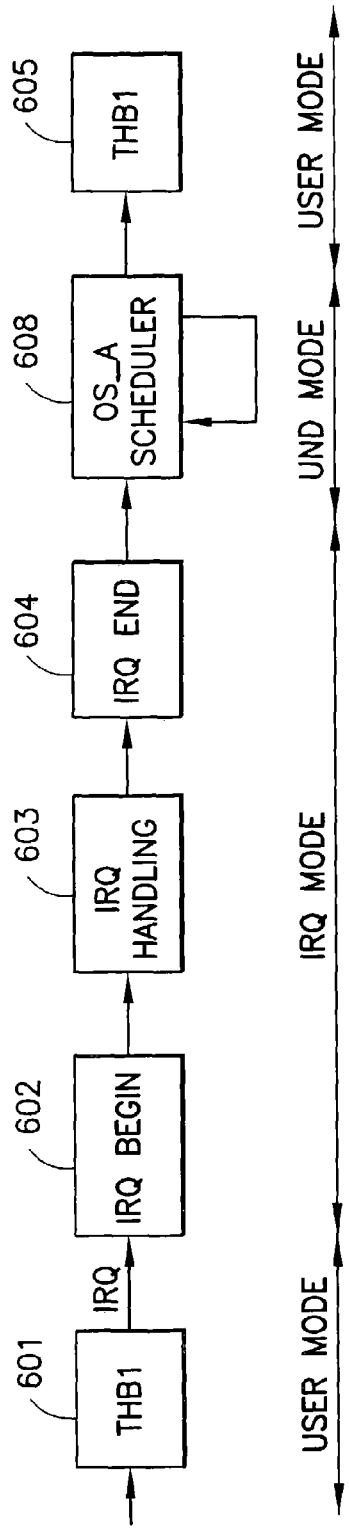
Figure 8:
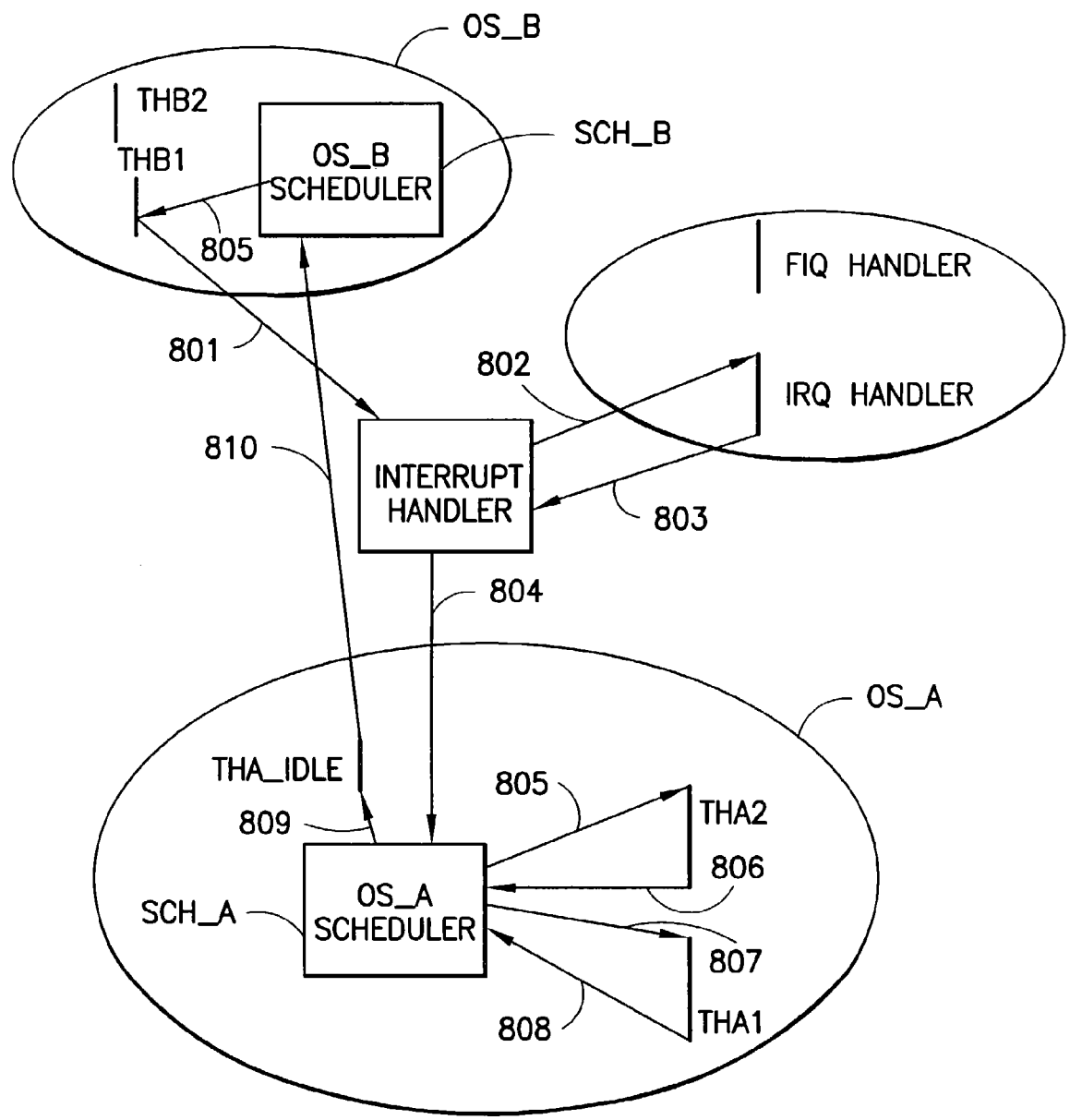
FIG. 8 illustrates a reduced arrow diagram of one situation of handling interrupts in the embedded system according to a preferred embodiment of the invention.

FIG. 6c illustrates a situation, wherein in case of a normal interrupt, the processor 2 is running a thread THB1 (block 601) under the second operating system OS_B, which thread comprises e.g. the process in the data processing function that relates to the application program activated by the user. This situation is illustrated also by means of an arrow diagram in FIG. 8. The processor 2 is in the user mode USER. Thus, the mode changes to the normal interrupt mode IRQ and the process moves to run the begin of normal interrupt function (block 602) and thereafter to the service program of normal interrupt (block 603 in FIG. 6c, arrows 801 and 802 in FIG. 8). The interrupt caused a need to run at least one thread of the first operating mode OS_A, but no delayed service routines DSR were formed in the interrupt. After the interrupt has ended (arrow 803) the end of normal interrupt function (block 604) is called, where the information of the end of the interrupt is set. After the service program of normal interrupt has ended, the mode of the processor 2 is changed to the undefined mode UND and at the same time the scheduler SCH_A of the first operating system is called, which scheduler sets new status for the threads if needed (block 608 in FIG. 6c, arrow 804 in FIG. 8). Subsequently, the threads of the first operating system OS_A that are waiting for execution (READY mode threads) are run (arrows 805 to 808). Thereafter, when no threads are waiting to be run, the mode of the processor 2 is set back to the user mode USER and the execution is continued from the interrupted thread THB1 of the second operating system OS_B (block 605 in FIG. 6c, arrows 809, 810 and 811 in FIG. 8).

In an example illustrating this situation, an unanswered call has been received by the communication device 1. Thus, the display device 10 of the mobile station functions as well as the display device 15 of the data processing functions show a message of received, unanswered calls, e.g. a text "1 missed call". The user presses an enter key (not shown) of the data processing functions, wherein a normal interrupt IRQ is formed. In the interrupt handling, the thread of the first operating system OS_A, by which said text can be erased from the display device 10 of the mobile station functions, is set to wait for the run mode. After the interrupt has ended, the processor 2 moves to run the scheduler SCH_A of the first operating system, wherein the thread of the first operating system OS_A can, after having reached the run mode erases said text from the display device 10 of the mobile station functions.

Figure 6D:
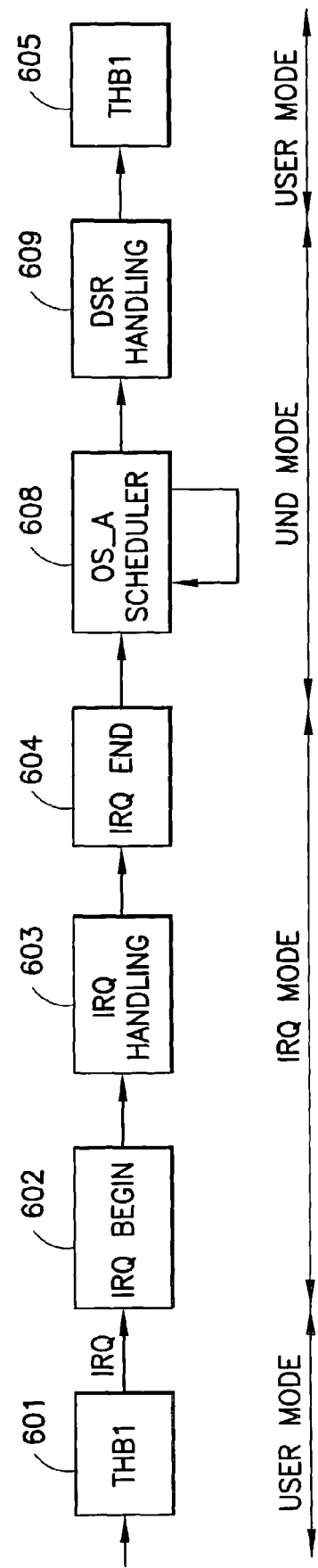

FIG. 6d illustrates a situation in which, when a normal interrupt occurs, the processor 2 is running a thread THB1 under the second operating system OS_B (block 601) and is set to the user mode USER. Thus, the mode is changed to the normal interrupt mode IRQ and the processor 2 moves to run the begin of normal interrupt function (block 602) and, thereafter, the service program of normal interrupt (block 603). The interrupt caused a need to run at least one thread of the first operating system OS_A. In addition, in the interrupt, and/or in some thread of the first operating system OS_A running after the interrupt, a delayed service routine DSR was formed.

After the interrupt has ended, the end of normal interrupt function (block 604) is called, where the information of the end of the interrupt is set. After the service program of normal interrupt has ended, the mode of the processor 2 is changed to the undefined mode UND, and the scheduler SCH_A of the first operating system is called, which sets new status to the threads if needed, and directs the threads of the first operating system OS_A that are waiting to be run to execution in accordance with its scheduling procedure (block 608). After no threads of the first operating system OS_A remain waiting for execution, the delayed service routines DSR of the second operating system OS_B are handled, whereafter the mode of the processor 2 is set back to the user mode USER and the execution is continued from the interrupted thread THB1 of the second operating system OS_B (block 605), because the thread of the second operating system OS_B which was changed by the delayed service routine of the status had a lower priority than the interrupted thread THB1 of the second operating system OS_B.

An example which can be mentioned, is a case in which the user has written a short message (SM) by the keypad 14 of the data processing functions. Pressing of a transmission key (not shown) causes a normal interrupt IRQ. In an interrupt handling, the thread or threads of the first operating system OS_A are set to wait for the run mode for reading the message to be transmitted from the buffer and for transmitting, and on the display device 15 of the data processing functions an icon is formed, by which it is informed to the user that a message will be transmitted. After the interrupt has ended, the processor 2 moves to run the scheduler SCH_A of the first operating system, wherein the thread of the first operating system OS_A transmits the message in the run mode, whereafter a delayed service routine DSR is formed to erase the icon. Subsequently, the scheduler SCH_B of the second operating system sets to the run mode the interrupted thread THB1 of the second operating system OS_B, because its priority in this exemplifying situation is higher than the priority of the icon-erasing thread of the second operating system OS_B. Later this thread reaches the run mode and erases said text from the display device 15 of the data processing functions.

Figure 6E:
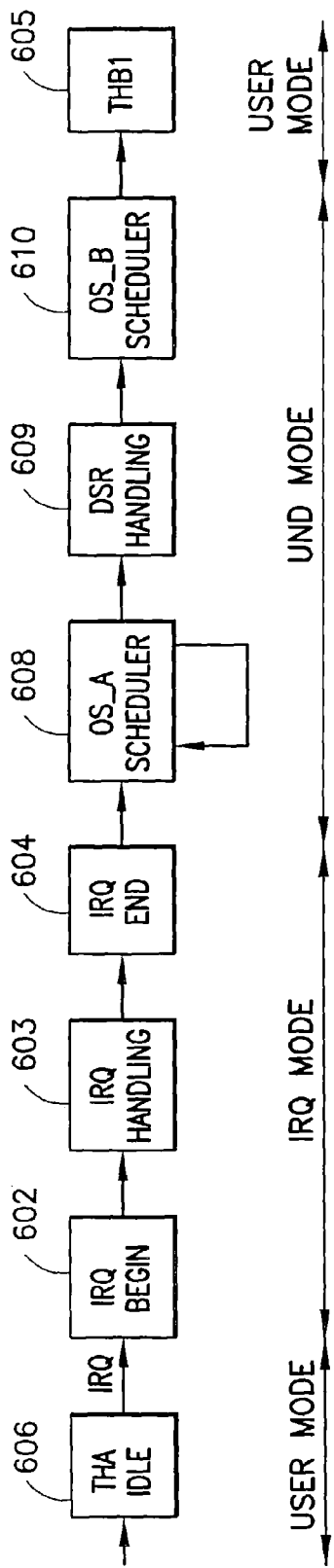

FIG. 6e illustrates a situation where, when a normal interrupt is coming, the processor 2 is running the idle thread THA_IDLE (block 606) of the first operating system OS_A and is set to the undefined mode UND. Thus, the mode is changed to the normal interrupt mode IRQ and the processor 2 moves to run the begin of normal interrupt function (block 602) and thereafter to the service program of normal interrupt (block 603). The interrupt caused a need to run at least one thread of the first operating system OS_A. Further, in an interrupt and/or the thread of the first operating system OS_A a delayed service routine DSR was formed, which further causes the changing of status of one or more thread of the second operating system OS_B to wait for execution (READY). After the interrupt has ended, the end of normal interrupt function (block 604) is called, where information of the end of the interrupt is set. After the service program of normal interrupt has ended, the mode of the processor 2 and the status of the first operating mode OS_A are changed. The mode of the processor 2 is changed to the undefined mode UND, whereafter the scheduler SCH_A of the first operating system (block 608) is requested, which sets the threads at their turn to the run mode, i.e., the threads of the first operating system OS_A that are waiting for execution (in READY mode) are run. After no threads of the first operating system OS_A are waiting for execution, the delayed service routines DSR of the second operating system OS_B are handled (block 609), whereafter the scheduler SCH_B of the second operating system is called (block 610), which sets, in the running order of the second operating system OS_B, preferably in a priority order, the first thread that is waiting for the execution to the run mode. Thereafter the mode of the processor 2 is set back to the user mode USER and the running continues from the thread THB1 of the second operating system OS_B (block 605), that has the highest priority at the time. The scheduler SCH_B of the second operating system controls the running of the threads according to its scheduling principles.

In an exemplifying situation, in the communication device 1 a short message has arrived, which is illustrated, by an icon on the display device 10 of the mobile station functions and the display device 15 of the data processing functions. The user presses a read key (not shown) on the keypad 9 of the mobile station functions, which causes a normal interrupt IRQ. In the interrupt handling, the thread or threads of the first operating system OS_A are set to wait for the run mode in order to erase the icon from the display device 10 of the mobile station functions and to show a received message on the display 10 of the mobile station functions. In addition, a delayed service routine DSR is formed in order to erase the icon from the display device 15 of the data processing device. The processor 2 runs after the interrupt the scheduling functions of the first operating system OS_A, handles the delayed service routines DSR and moves to run the scheduling functions of the second operating system OS_B, wherein the thread of the second operating system, after reaching to execution, erases the icon from the display device 15 of the data processing functions.

Figure 6F:
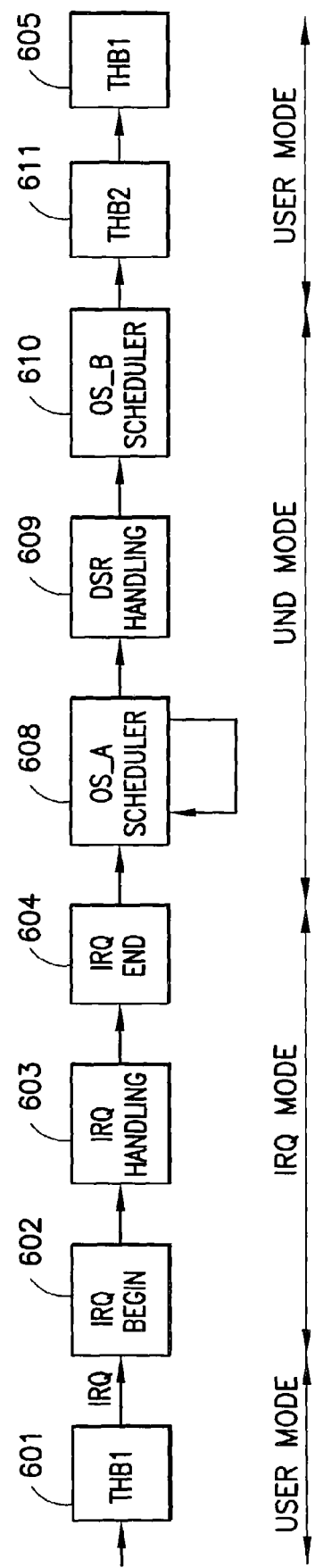
Figure 6I:
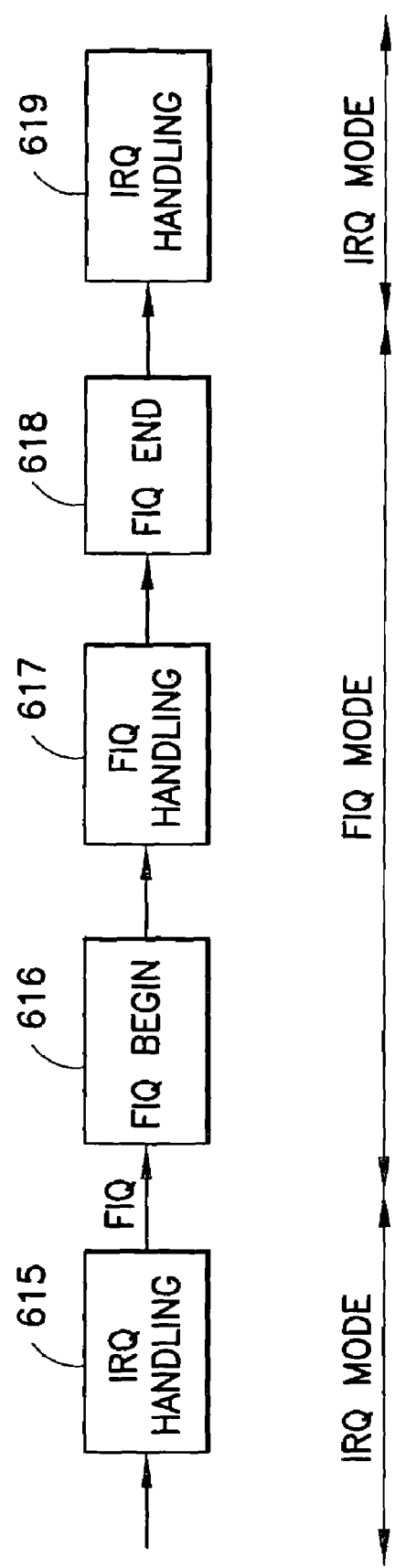

FIG. 6f illustrates a situation in which, when a normal interrupt comes, the processor 2 performs the thread THB1 of the second operating system OS_B (block 601) and is set to the user mode USER. Thus, the mode changes to the normal interrupt mode IRQ and the processor 2 moves to run the begin of normal interrupt function (block 602) and thereafter to the service program of normal interrupt (block 603). The interrupt caused a need to run at least one thread of the first operating system OS_A. Further, in the interrupt and/or in some thread of the first operating system OS_A that is running after the interrupt a delayed service request DSR was formed, which further causes a resetting of the execution times of the threads of the second operating system OS_B. After the interrupt has ended, the end of normal interrupt function (block 604) is called, where information of the end of the interrupt is set. After the service program of normal interrupt has ended, the mode of the processor 2 and the status of the first operating system OS_A is changed. The mode of the processor 2 is changed to the undefined mode UND, whereafter the scheduler SCH_A of the first operating system is called, which sets new status to the thread, if needed (block 608). Subsequently, the threads of the first operating system OS_A which are waiting for execution are run (threads in READY mode). Thereafter, when no threads waiting to be run are left, the delayed service routines DSR of the second operating system OS_B are handled (block 609), whereafter the scheduler SCH-B of the second operating system OS_B is called (block 610), which sets the thread of the second operating system OS_B that is waiting in the first position of the running order to be executed in the run mode. In the present example, the interrupt handling caused that the interrupted thread THB1 is not yet the one to move to the run mode, but instead another thread THB2 of this second operating mode OS_B, whose status changed to wait for run. The mode of the processor 2 is set back to the user mode USER, whereafter the processor 2 is moved to run the thread THB2, which was set to the run mode (block 611). The interrupted thread THB1 reaches the run mode at its turn (block 605).

An example of the foregoing is a situation in which the user is writing a short message by using the keypad 14 of the data processing functions and connects a charging device (not shown) to the communication device 1. This causes a normal interrupt IRQ. In the interrupt handling, the thread of the first operating system OS_A, which on the display device 10 of the mobile station functions forms an icon informing that the charge is carried out, is set to wait for the run mode. Further, by means of a delayed service routine DSR a corresponding icon is formed on the display device 15 of the data processing functions.

FIG. 6g illustrates a situation in which, when a normal interrupt is coming, the processor 2 is running the thread THA1 under the first operating system OS_A (block 612), which is e.g. the connection-establishing application in the mobile station functions of the communication device 1. The processor 2 is in the undefined mode UND. Thus, the mode changes to the normal interrupt mode IRQ and the processor 2 moves to run the begin of normal interrupt function (block 602) and thereafter the service program of normal interrupt (block 603). The interrupt did not cause any need for running the threads of the first operating system OS_A, wherein after the interrupt, the scheduler SCH_A of the first operating system is not called. After the interrupt has ended, the end of normal interrupt function is called (block 604), where the information of the end of the interrupt is set. After the end of normal interrupt, the mode of the processor 2 and status of the first operating system OS_A are changed. The mode of the processor 2 is changed back to the undefined mode UND and the running is continued from the interrupted thread THA1 (block 613). Although delayed service routines DSR of the second operating system OS_B were formed in the interrupt, these would not come to handling before all the running threads of the first operating system OS_A are executed.

The user is e.g. dialling a telephone number, wherein key pressings cause a normal interrupt IRQ. In the interrupt handling, the pressing of the key is read into the memory 17 and printed from the display device 10 of the mobile station functions and return is made to wait for the next key press.

FIG. 6h illustrates a situation in which, when a normal interrupt is coming, the processor 2 is running a thread THA1 under the first operating system OS_A (block 612), which is e.g. a connection-establishing application in the mobile station functions of the communication device. The processor is in the undefined mode. Thus, the mode changes to the normal interrupt mode IRQ and the processor 2 moves to run the begin of normal interrupt function (block 602) and thereafter the service program of normal interrupt (block 603). The interrupt caused a need for running at least one thread of the first operating mode OS_A. After the interrupt has ended, the end of normal interrupt function (block 604) is called, where the information of the end of the interrupt is set. After the end of the service program of normal interrupt, the mode of the processor 2 and the status of the first operating system OS_A are changed. The mode of the processor 2 is changed to the undefined mode UND, whereafter the scheduler SCH_A of the first operating system is requested, which sets new status for the threads, if needed (block 608). Subsequently, the threads of the first operating system OS_A that are waiting for execution (in READY mode) are run according to the priority order. In this example the interrupt caused the second thread THA2 to move immediately to execution (block 614), wherein the interrupted thread THA1 comes to the running turn possibly later (block 613). Although delayed service routines DSR of the second operating system OS_B were formed in the interrupt, these would not be run before all the running threads of the first operating system OS_A were executed.

The user has e.g. dialled a telephone number and pressed a handset-up key (not shown) which causes a normal interrupt IRQ. After the interrupt handling, the scheduler SCH_A of the first operating system sets a connection-establishing thread to execution.

FIG. 6i further illustrates a situation in which a fast interrupt FIQ comes, when the normal interrupt service routine is running (block 615). The processor 2 is in the normal interrupt mode IRQ and moves to the fast interrupt mode FIQ and runs the begin of fast interrupt function (block 616) and thereafter the service program of fast interrupt FIQ (block 617). After the fast interrupt handling has ended, the end of fast interrupt function (block 618) is called, where the information of the end of fast interrupt FIQ is set. After the service program of the fast interrupt has ended, the status of the first operating system OS_A and the mode of the processor 2 is set back to the normal interrupt state IRQ, whereafter the operation is continued from the interrupted location (block 619).

To provide an example of this situation the processor 2 is running the interrupt handling of the keypad 9, 14, when a timer (not shown) arranged in the communication device 1, e.g. in an application specific integrated circuit 3, forms a fast interrupt FIQ. The processor 2 reads the value of the timer and stores it into the memory 17. After this, the processor 2 returns to the interrupt handling of the keypad 9, 14.

In connection with the above-described mode changes of the processor 2, the processor 2 advantageously starts using different registers, wherein transfer of data into a temporary storage location is not always necessary. However, in some interrupt situations, the data transfer can be needed, wherein this retards the handling of the interrupt to some extent. Also, some microprocessors used as processors 2 do not comprise all the above-described modes, wherein these different modes can be indicated by means of mode variables or the like.

Sometimes it can be necessary to determine a response time also to the second operating system OS_B. Thus, the scheduler SCH_A of the first operating system can raise the priority of the idle thread THA_IDLE of the first operating system OS_A in a situation in which the execution time remained for the second operating system OS_B would be less than the response time would require. Thus, the idle thread THA_IDLE of the first operating system OS_A comes to the running turn before other, non-critical threads, which causes the transfer to the running of the second operating system OS_B. This raise of priority level can be activated e.g. by a timer which is set to interrupt after a predetermined time. In case the processor 2 has not reached the idle thread THA_IDLE of the first operating system OS_A when the timer interrupt comes, the scheduler SCH_A of the first operating system is called, which raises the priority of the idle thread THA_IDLE. In this context, however, it is to be noted that it is advantageous to raise the priority of the idle thread THA_IDLE only for a short period at the time, so that also the non-critical tasks of the first operating system OS_A are regularly provided with execution time. The priority of the idle thread THA_IDLE cannot be raised to a too high level, because the critical threads of the first operating system OS_A have to be executed. This kind of scheduling can also be called as interleaved scheduling.

Figure 9:
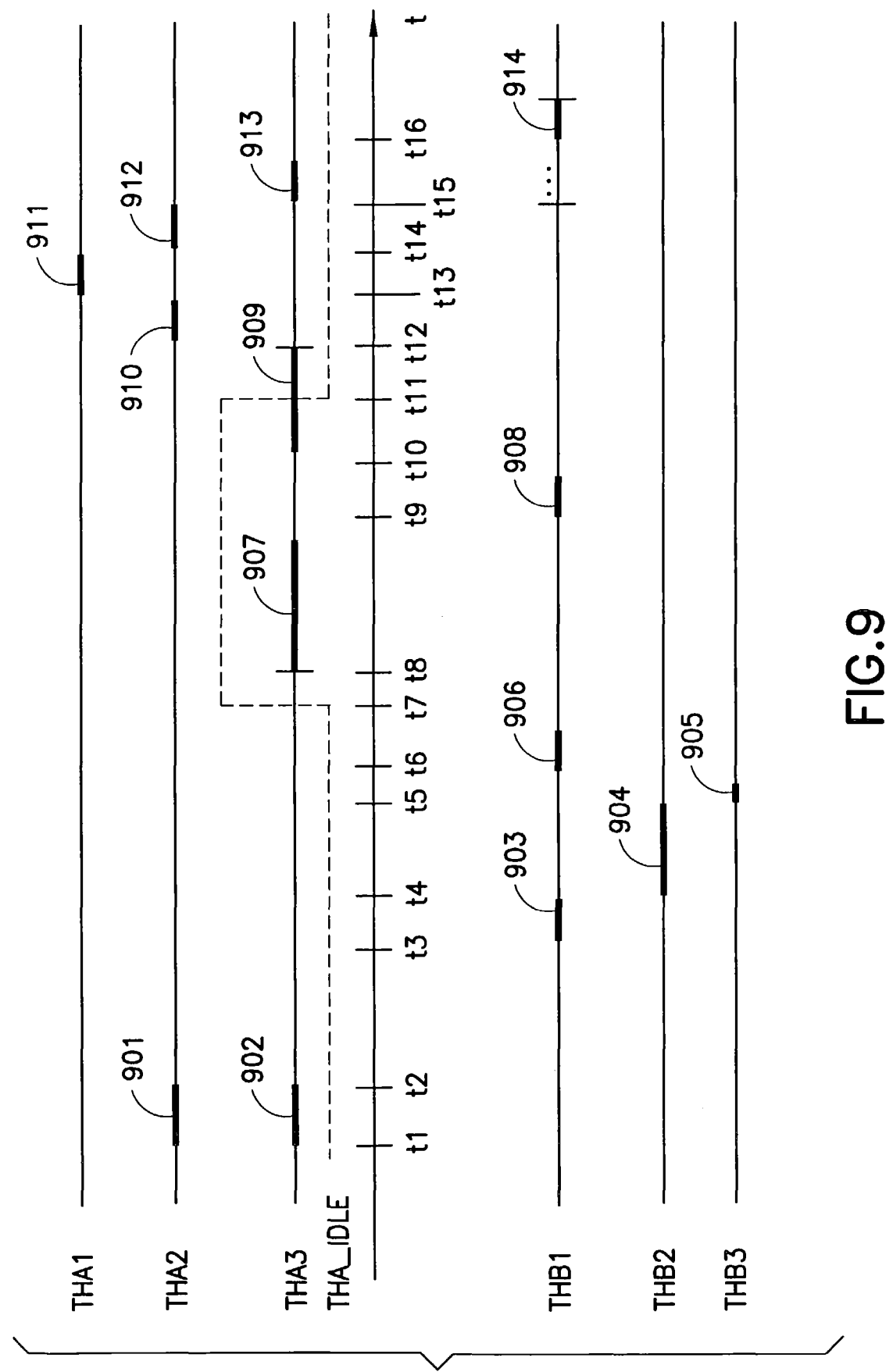
FIG. 9 illustrates a timing diagram of an interleaved scheduling option in the embedded system according to a preferred embodiment of the invention.
Figure 10:
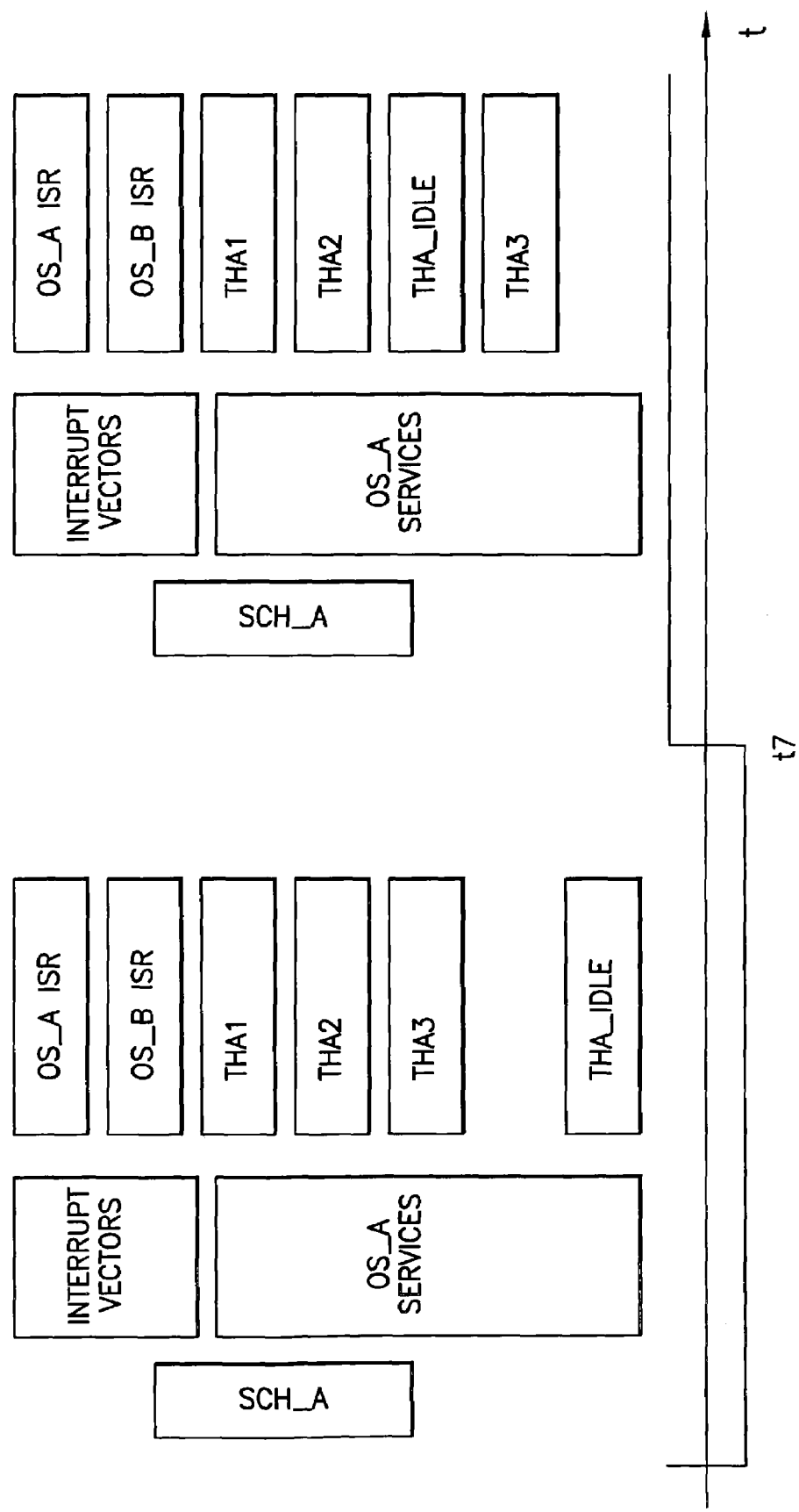
FIG. 10 illustrates a functional diagram of an interleaved scheduling option in the embedded system according to a preferred embodiment of the invention.

The accompanying FIGS. 9 and 10 illustrates an example of the above mentioned interleaved scheduling option. In FIG. 9 there is described a timing diagram of an example situation where the running threads THA1, THA2, THA3 of the processes running in the first operating system OS_A and the running threads THB1, THB2, THB3 of the second operating system OS_B are to be executed. In FIG. 10 there is described a process diagram of the first operating system OS_A to further clarify the interleaved scheduling.

In this exemplifying diagram there are presented three threads THA1, THA2, THA3 of the processes running in the first operating system OS_A and three threads THB1, THB2, THB3 of the processes running in the second operating system OS_B, but it will be understood that there can be more or less threads running in the operating systems OS_A, OS_B.

The first thread THA1 of the first operating system OS_A is for example a phone application and it has quite a high priority. The third thread THA3 of the first operating system OS_A is provided for example for the user interface. The priority of the second thread THA2 is lower than the priority of the first thread THA1, and the priority of the third thread THA3 is lower than the priority of the second thread THA2 in the first operating system OS_A.

The first thread THB1 of the second operating system OS_B is for example a program for communication via the interface block 16. The second THB2 and the third threads THB3 of the second operating system OS_B are for example some PDA applications, for example a notepad application and a calendar application. In this example it is assumed that the priority of the first thread THB1 of the second operating system OS_B is higher than the priority of the second thread THB2 of the second operating system OS_B and that the piority of the third thread THB3 of the second operating system OS_B is lowest of these three threads.

In FIG. 9 the execution of a thread is presented as a thicker line. For example at time t1 the second thread THA2 of the first operating system OS_A comes to the running turn. This is designated with the reference 901. At a later time t2 the third thread THA3 of the first operating system OS_A comes to the running turn 902. It is also assumed that this is the last thread before the idle thread THA_IDLE of the first operating system OS_A. Therefore after a while, the first thread THB1 of the second operating system OS_B comes to the running turn 903 at time t3 to check if there is need to communicate via the interface block 16. At a later time t4 the second thread THB2 of the second operating system OS_B comes to the running turn 904. There is also some execution time 905 left at time t5 for the third thread THB3 of the second operating system OS_B. In this example the next thread to come to running turn 906 is the first thread THB1 of the second operating system OS_B at time t6.

The above situation is also illustrated in the FIG. 10, left from the time t7. The threads THA1, THA2, THA3, scheduler SCH_A, interrupt service routines ISR, interrupt vectors and other services of the first operating system are presented as blocks in the FIG. 10. The priority of the threads are arranged in the FIG. 10 so that the highest thread has the highest priority. The idle thread THA_IDLE of the first operating system OS_A has the lowest priority. At time t7 the scheduler SCH_A of the first operating system OS_A changes the priority of the idle thread THA_IDLE of the first operating system OS_A for a while. This situation is illustrated right from the time t7 in FIG. 10. At time t11 the scheduler SCH_A of the first operating system OS_A changes the priority of the idle thread THA_IDLE of the first operating system OS_A back to the lowest priority. The change of priority of the idle thread THA_IDLE of the first operating system OS_A can be arrenged for example by a timer, by some event, etc.

The user for example presses some key of the second interface UI2. Therefore the third thread THA3 of the first operating system OS_A comes again to the running turn 907 at time t8. The scheduler SCH_A has also rised the priority of the idle thread THA_IDLE of the first operating system OS_A. The third thread THA3 of the first operating system OS_A is running while there is need for transmission via the interface block 16. This causes an interrupt and because the priority of the idle thread THA_IDLE is at this time t9 higher than the priority of the third thread THA3 of the first operating system OS_A, the execution of the third thread THA3 of the first operating system OS_A is interrupted and the first thread THB1 of the second operating system OS_B comes to running turn 908. After execution of the the first thread THB1 of the second operating system OS_B, the execution of the third thread THA3 of the first operating system OS_A continues 909 at time t10.

The scheduler SCH_A drops the priority of the idle thread THA_IDLE of the first operating system OS_A back to the lowest level at time t11 in this example.

The execution of the third thread THA3 of the first operating system OS_A is interrupted again at time t12 because there is higher priority thread signalled for execution 910. This thread is for example the second thread THA2 of the first operating system OS_A.

At time t13 the execution of the second thread THA2 of the first operating system OS_A is interrupted because there is higher priority thread: the first thread THA1 of the first operating system OS_A signalled for execution 911.

The execution of the second thread THA2 of the first operating system OS_A continues 912 after the first thread THA1 of the first operating system OS_A has been executed at time t14.

At time t15 the execution of the second thread THA2 of the first operating system is finished. At the same time t15 also the first thread THB1 of the second operating system becomes ready to run. However, the execution of the third thread THA3 of the first operating system OS_A continues 913 at time t15. This is opposite to the earlier behaviour at time t9.

The execution of the third thread THA3 of the first operating system OS_A continues 913 after the second thread THA2 of the first operating system OS_A has been executed at time t15.

The first thread THB1 of the second operating system OS_B comes to running turn 914 at time t16 to service transmission via interface block 16.

Table 1 further summarises the transfers form one mode to another in connection with interrupts. The first vertical line illustrates the mode of the processor 2 when the mode changed, and the first horizontal line illustrates the mode to which the processor 2 is transferred. Other boxes of the table illustrate the situation which causes the change in the respective modes. The abbreviations refer to the abbreviations used of different modes and interrupts earlier in the specification.

TABLE 1

|  | USER | UND | SVC | IRQ | FIQ |
| --- | --- | --- | --- | --- | --- |
| USER | — | — | OS_B thread requests SWI | IRQ interrupts OS_B thread | FIQ interrupts OS_B thread |

TABLE 1-continued

|     | USER | UND | SVC | IRQ | FIQ |
| --- | --- | --- | --- | --- | --- |
| UND | return from the last OS_A thread or DSR | — | DSR or idle thread requests SWI | IRQ interrupts OS_A thread, DSR or idle thread | FIQ interrupts OS_A thread, DSR or idle thread |
| SVC | return from fast SWI | during slow SWI | — | IRQ interrupts fast SWI | FIQ interrupts fast SWI |
| IRQ | return from IRQ, if no active OS_A threads or DSR exist | return from IRQ, if active OS_A-threads or DSR exist | — | — | FIQ interrupts IRQ |
| FIQ | return from FIQ if no active OS_A threads or DSR | return from FIQ if active OS_A threads or DSR | — | return from FIQ if IRQ interrupted | — |

Figure 7B:
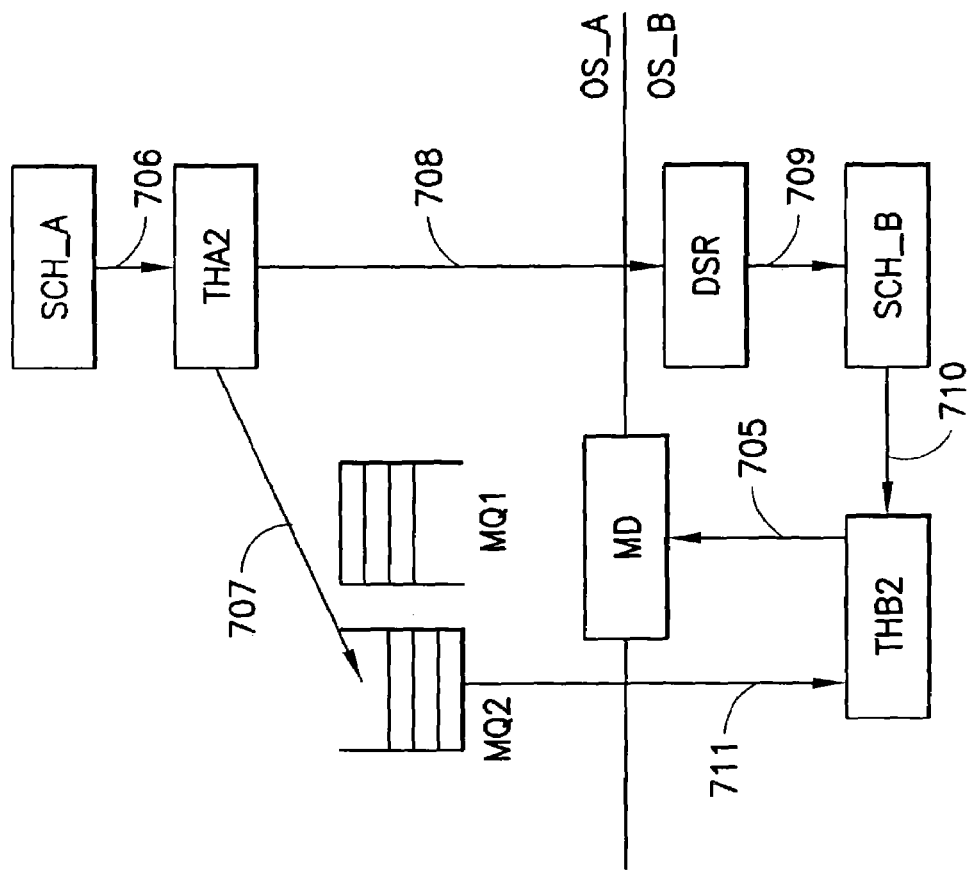
FIGS. 7a and 7b illustrate a reduced diagram of a mechanism in message transmission.
Figure 7A:
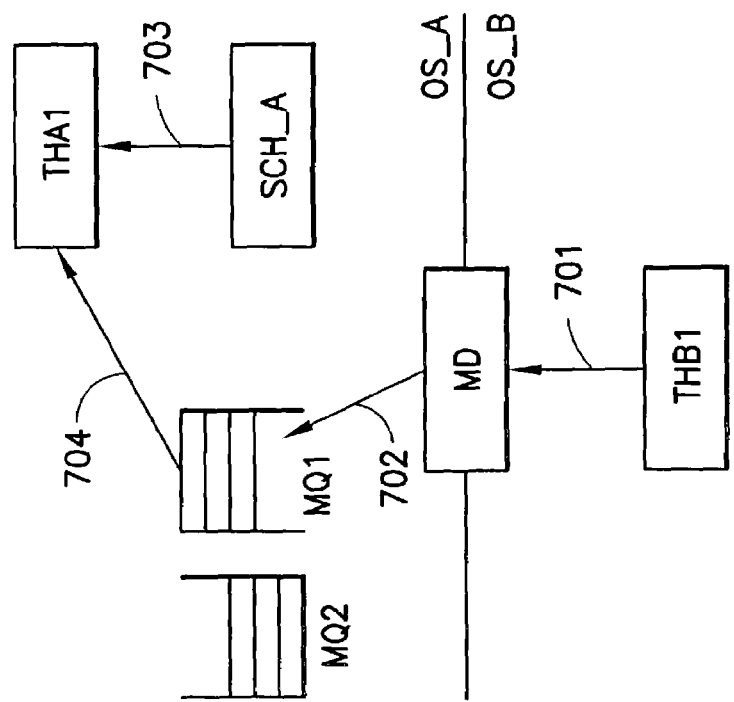

The following example describes transmission of messages between threads that are executed in different operating systems OS_A, OS_B. FIGS. 7a and 7b illustrate this message transmission mechanism as a reduced diagram. A message driver MD is common for the operating systems OS_A, OS_B, as well as message queues MQ1, MQ2. The running thread THB1 of the second operating system OS_B calls the message driver MD and transmits as parameters an advantageously transmitted message, e.g. a text message, and a symbol of the object thread THA1 (arrow 701, FIG. 7a). The message driver MD transfers the message to the first message queue MQ1 (arrow 702) and forms advantageously a software interrupt (SWI), wherein this interrupt activates an interrupt handling substantially in accordance with FIG. 6c described earlier in this specification, except that the interrupt was IRQ. Leaving the interrupt handler brings about the activation of the scheduler SCH_A of the first operating system, wherein the object thread is executed in the phase determined by the priority (arrow 703). This object thread THA1 reads the message in the first message queue MQ1 (arrow 704) and runs e.g. the transmission of the message to a radio path.

In the application program of the first operating system OS_A, a delayed service routine DSR can be executed, by which it is e.g. possible to transmit message to the threads of the second operating system OS_B e.g. in the following manner (FIG. 7b). In the second operating system OS_B, the running thread THB2 has formed a message request and remained to wait for the message (arrow 705).

The message request has caused a software interrupt SWI, wherein the interrupt handler has checked the cause of the interrupt and concluded that the thread THB2 of the second operating system OS_B is waiting for a message from the thread THA2 of the first operating system OS_A. After the interrupt handling, the scheduler SCH_A of the first operating system (arrow 706) is called. After the wished thread THA2 is in turn to be run, it forms a message and adds it to the second message queue MQ2 (arrow 707). Further, the thread THA2 forms a delayed service routine DSR (arrow 708). Subsequent to running the threads of the first operating system OS_A, this delayed service routine DSR is handled, wherein the delayed service routine DSR added by the thread THA2 changes the status of the thread of the second operating system OS_B to wait for the execution (READY) (arrow 709). The scheduler SCH_B of the second operating system OS_B controls the threads to execution according its scheduling principles. As the thread THB2 that has sent the transmission request is running. (arrow 710), it reads the message from the second message queue MQ2 through the connecting interface of the message driver MD (arrow 711).

In practical embodiments the message queues MQ1, MQ2 can preferably be arranged according to priorities. This means that a message with a receiving thread of a high priority passes in queue messages with a lower priority. Alternatively, more message queues are used than the first MQ1 and the second message queue MQ2 used in this example.

As a summary it can be noted that the present invention enables the operation of two or more operating systems OS_A, OS_B to be used under one processor. An aim has been to minimize the common parts, wherein prior art applications can be run also in this communication device 1. The common part of the operating systems OS_A, OS_B consists mainly of the interrupt handlers, in which the connections to the operating systems OS_A, OS_B are formed. Also the message driver MD is common in the above-described example.

It is possible in practical embedded systems 1 that for the different operating systems OS_A, OS_B many common interrupt handlers (interrupt service routines) are arranged. One of these interrupt handlers per one interrupt can be active at a time, i.e., e.g. one for a fast interrupt FIQ, one for a normal interrupt IRQ and one for a software interrupt SWI. It is thus possible to change one other interrupt handler arranged for said interrupt to be the active interrupt handler.

It should be mentioned that the operation of two operating systems OS_A, OS_B in a system of one processor 2 can be implemented also e.g. in a manner that of the threads THB1, THB2, THB_IDLE of the second operating system OS_B a thread of the first operating system OS_A is formed, such as the idle thread THA_IDLE or the super thread, wherein all the running threads THB1, THB2, THB_IDLE relating to the second operating system OS_B are executed in this thread. In a corresponding manner, it is possible to form of the threads THA1, THA2, THA_IDLE of the first operating system OS_A one thread of the second operating system OS_B, such as the idle thread THB_IDLE or the super thread 511, wherein all the running threads THA1, THA2, THA_IDLE relating to the first operating system OS_A are executed in this thread. Yet another alternative is that each thread THA1, THA2, THA_IDLE of the first operating system OS_A is formed as the super thread 511 separate to the second operating system OS_B, wherein the second operating system OS_B handles these as separate super threads (not shown). As described earlier in this specification, the response times of these super threads are typically considerably smaller than those of the normal threads. The tasks having the most critical response time requirements can still be run by forming an interrupt handling for them e.g. in connection with the interrupt handler of the timer, wherein scheduling functions are not necessarily used when moving to perform these tasks.

In case each thread THA1, THA2, THA_IDLE of the first operating system OS_A is implemented as a separate super thread 511 in the second operating system OS_B, a signal transmission according to the second operating system OS_B is required if it wished to transfer data between the different threads THA1, THA2, THA_IDLE of the first operating system OS_A. In contrast, when the threads THA1, THA2, THA_IDLE of the first operating system OS_A are implemented as one super thread 511, data transmission can be implemented in a more simple manner by using the message transmission method of the first operating system OS_A.

The invention is not restricted only to the embodiments presented above, but it can be modified within the scope of the accompanying claims.

The invention claimed is:

1. A communication device comprising:
one processor to run at least two operating systems simultaneously, wherein the at least two operating systems include:
  a first operating system for mobile station functions comprising a first group of threads, the mobile station functions including operations for communicating with another device, and
  a second operating system for data processing functions comprising a second group of threads, the data processing functions comprising operations for processing data internally in the communication device, the first and second operating systems communicating with each other,
the communication device further comprising at least one user interface,
means for generating an interrupt to the processor,
means for selecting a thread from said first group of threads and second group of threads to execute as a result of said interrupt and as defined by any applications, said means for selecting including at least one at least partly common interrupt handler for said at least two operating systems, and
means for transmitting interrupt data to the operating system from which the thread was selected including said thread to execute.

2. The communication device according to claim 1, wherein to simultaneously run the at least two operating systems the one processor is adapted to enable both the first operating system to set at least one thread of the first group of threads to be active, and the second operating system to set at least one thread of the second group of threads to be active at the same time.

3. A communication device comprising one processor to run at least two operating systems simultaneously, wherein the at least two operating systems include
a first operating system for mobile station functions comprising a first group of threads, the mobile station functions including operations for communicating with another device, and
a second operating system for data processing functions comprising a second group of threads, the data processing functions comprising operations for processing data internally in the communication device,
wherein the first and second operating systems communicate with each other,
the communication device further comprising at least a first user interface and a second user interface,
wherein the processor comprises at least the following modes:
user mode,
privileged mode,
undefined mode, and
one or more interrupt modes,
and that the first operating system being operable at least partly in the undefined mode, the second operating system being operable at least partly in the user mode, and that the interrupt handler being operable in some of the one of more interrupt modes.

4. A communication device according to claim 3, wherein said first user interface relates at least partly to said mobile station functions, and said second user interface relates at least partly to said data processing functions.

5. A communication device according to claim 4, wherein said first user interface is a phone interface, and said second user interface is a personal digital assistant interface.

6. A communication device according to claim 3 including means for moving from the execution of the first operating system to the execution of the second operating system, when no thread of the first operating system is running.

7. A communication device according to claim 3 including means for moving from the execution of the second operating system to run the first operating system when an interrupt to the processor affects the running of at least one thread under the first operating system.

8. A communication device according to claim 3, wherein at least the first operating system is a real time operating system.

9. A communication device according to claim 3, the threads of said first group of threads one thread comprising said second operating system.

10. The communication device according to claim 3, wherein to simultaneously run the at least two operating systems the one processor is adapted to enable both the first operating system to set at least one thread of the first group of threads to be active, and the second operating system to set at least one thread of the second group of threads to be active at the same time.

11. A communication device comprising:
a processor to simultaneously run a first operating system for mobile station functions comprising a first group of threads, the mobile station functions including operations for communicating with another device, and to simultaneously run a second operating system for data processing functions comprising a second group of threads, the data processing functions comprising operations for processing data internally in the communication device,
the first and second operating systems communicating with each other,
at least a first user interface and a second user interface,
means for generating an interrupt to the processor,
means for selecting a thread from said first group of threads and second group of threads to execute as a result of said interrupt and as defined by any applications, said means for selecting including at least one at least partly common interrupt handler for said at least two operating systems, and
means for transmitting interrupt data to the operating system from which the thread was selected including said thread to execute.

12. A communication device according to claim 11, wherein said first user interface relates at least partly to said mobile station functions, and said second user interface relates at least partly to said data processing functions.

13. A communication device according to claim 11, wherein said first user interface is a phone interface, and said second user interface is a personal digital assistant interface.

14. A communication device according to claim 11 including means for moving from the execution of the first operating system to the execution of the second operating system, when no thread of the first operating system is running.

15. A communication device according to claim 11 including means for moving from the execution of the second operating system to run the first operating system when an interrupt to the processor affects the running of at least one thread under the first operating system.

16. A communication device according to claim 11, the threads of said first group of threads one thread comprising said second operating system.

17. A communication device comprising:
a processor to simultaneously run a first operating system for mobile station functions comprising a first group of threads, the mobile station functions including operations for communicating with another device, and to simultaneously run a second operating system for data processing functions comprising a second group of threads, the data processing functions comprising operations for processing data internally in the communication device,
the first and second operating systems communicating with each other, and
at least a first user interface and a second user interface
wherein the processor comprises at least the following modes:
user mode,
privileged mode,
undefined mode, and
one or more interrupt modes,
and that the first operating system being operable at least partly in the undefined mode, the second operating system being operable at least partly in the user mode, and that the interrupt handler being operable in some of the one of more interrupt modes.

* * * * *